July 15, 1958     E. J. SARRING ET AL     2,843,283
INTEGRATED IMPRINTING AND LABELLING MACHINE
Filed Jan. 3, 1957                      18 Sheets-Sheet 1

INVENTORS
ERNEST J. SARRING,
OTHO KILE &
THEODORE W. MAYER
By: Schroeder, Hofgren,
Brady & Wegner
Attorneys

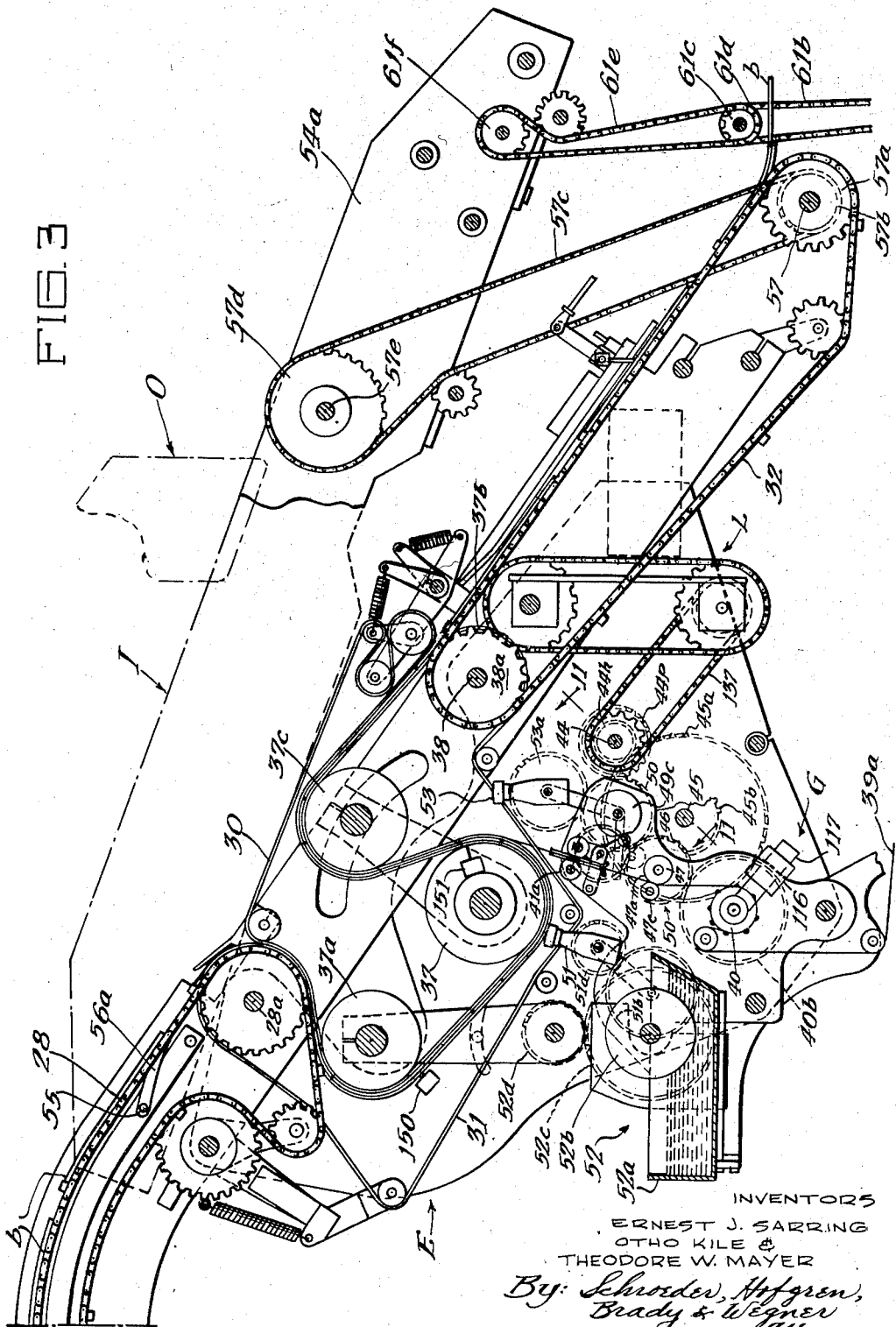

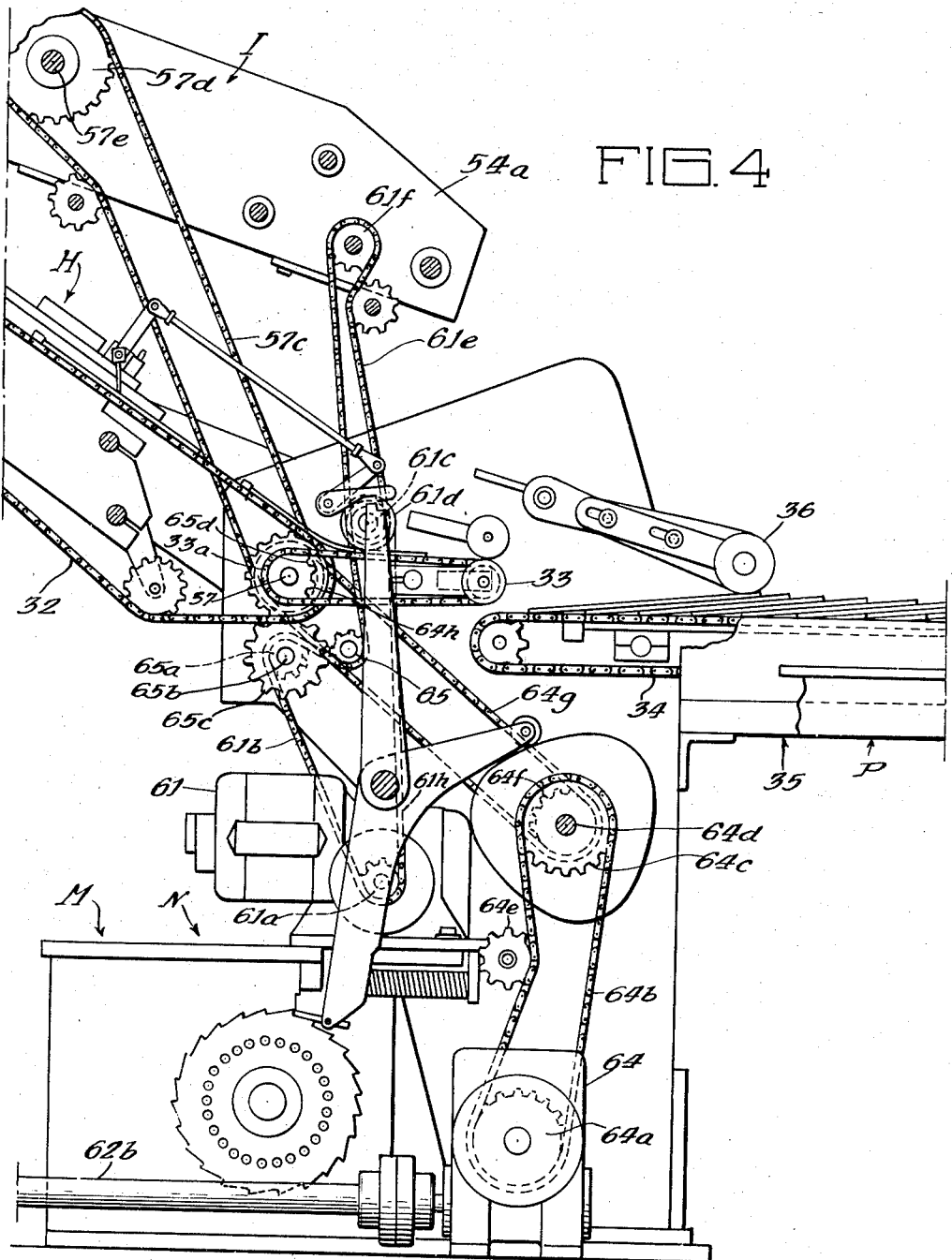

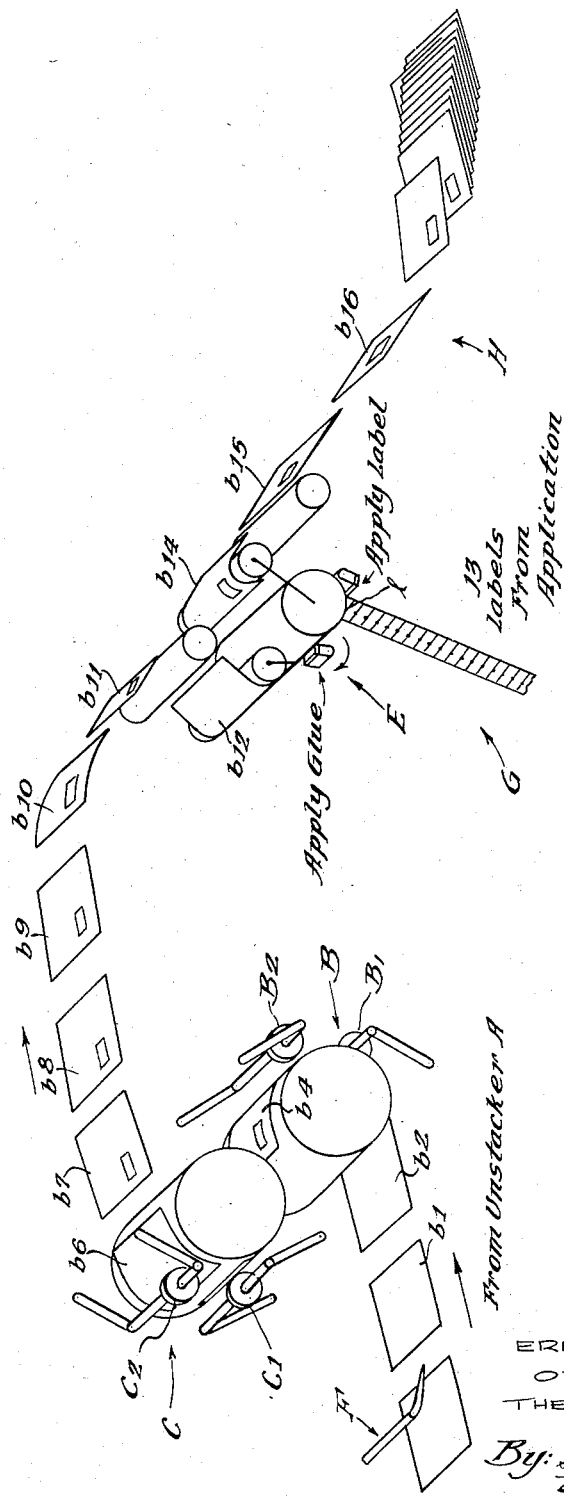

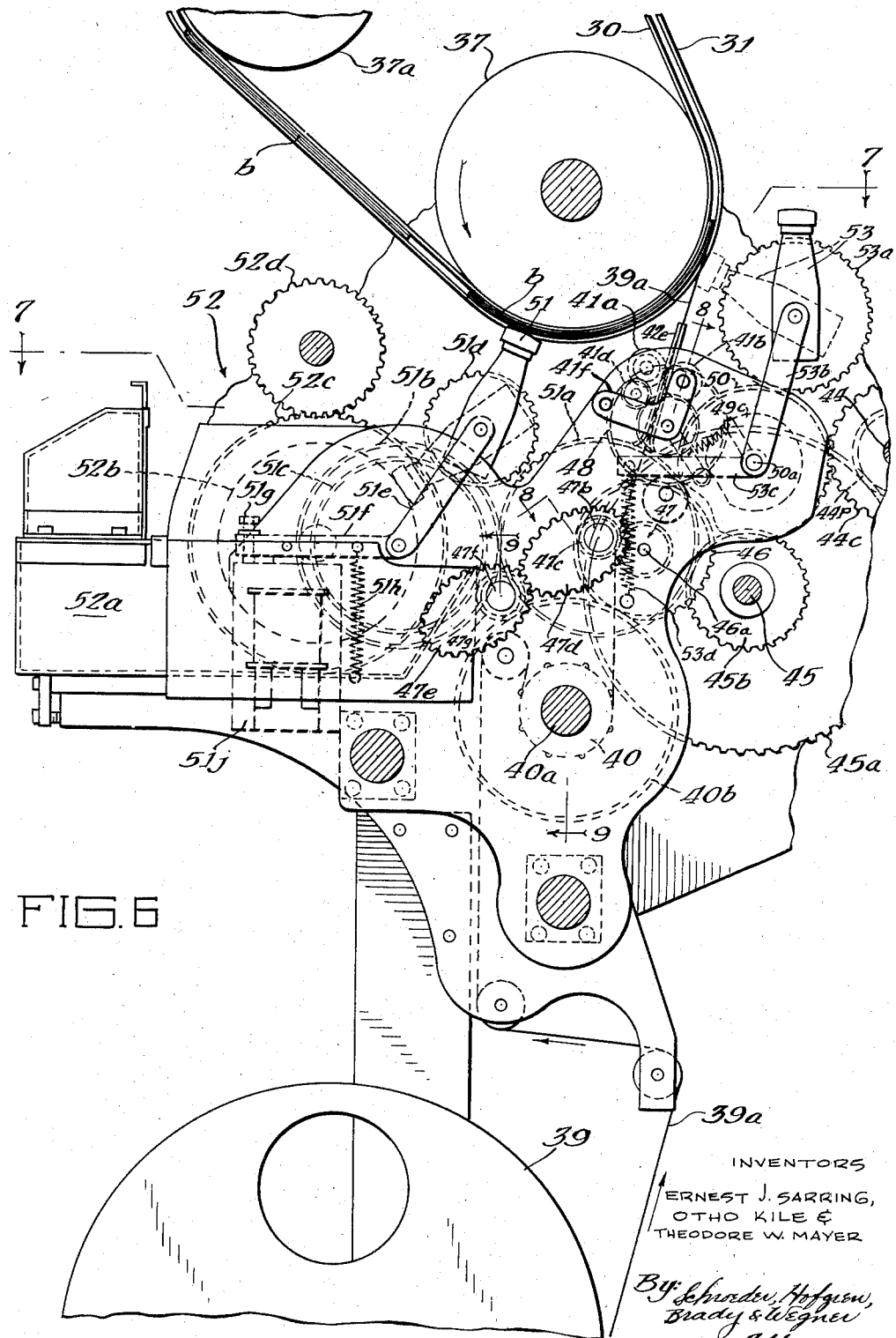

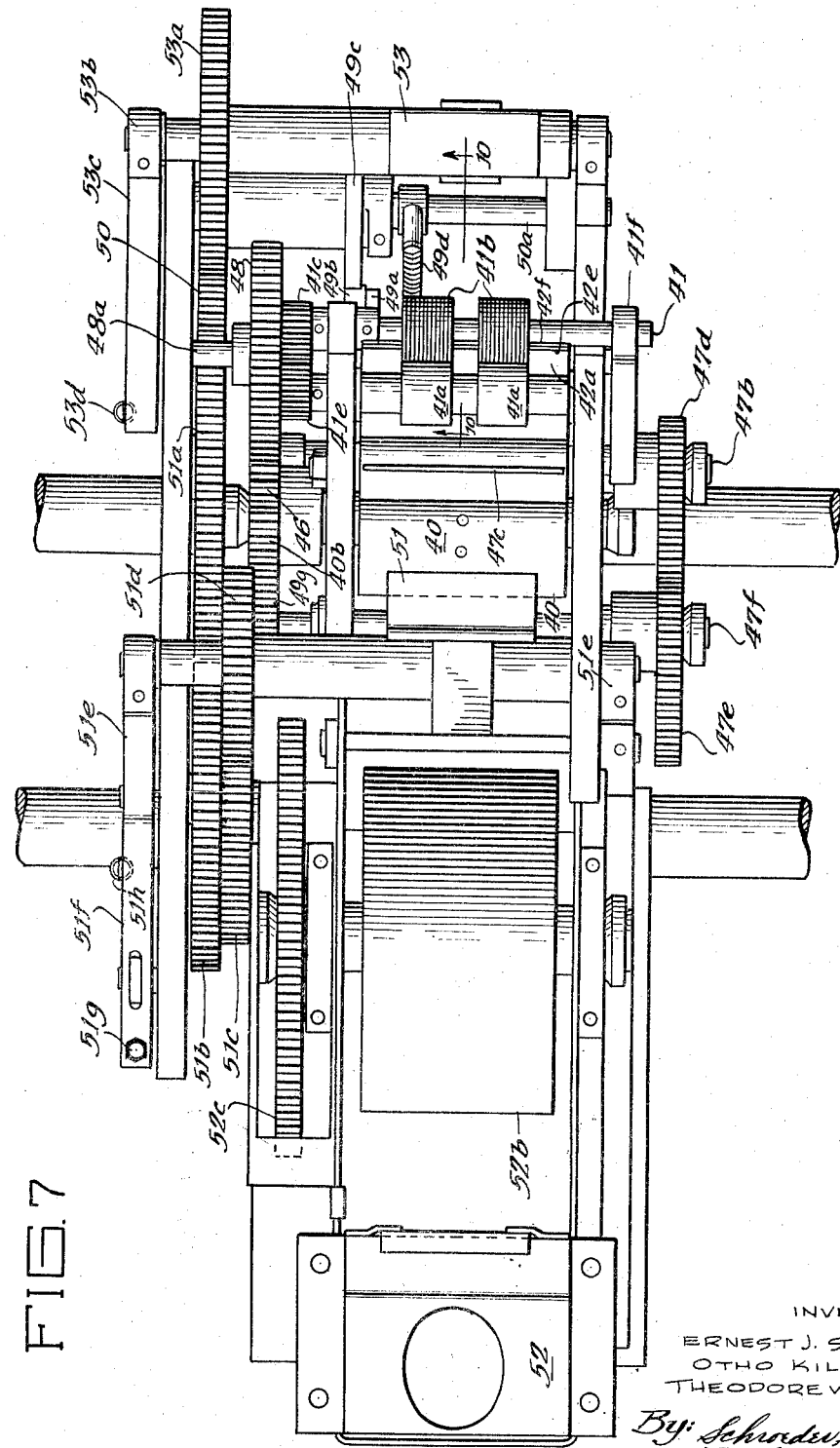

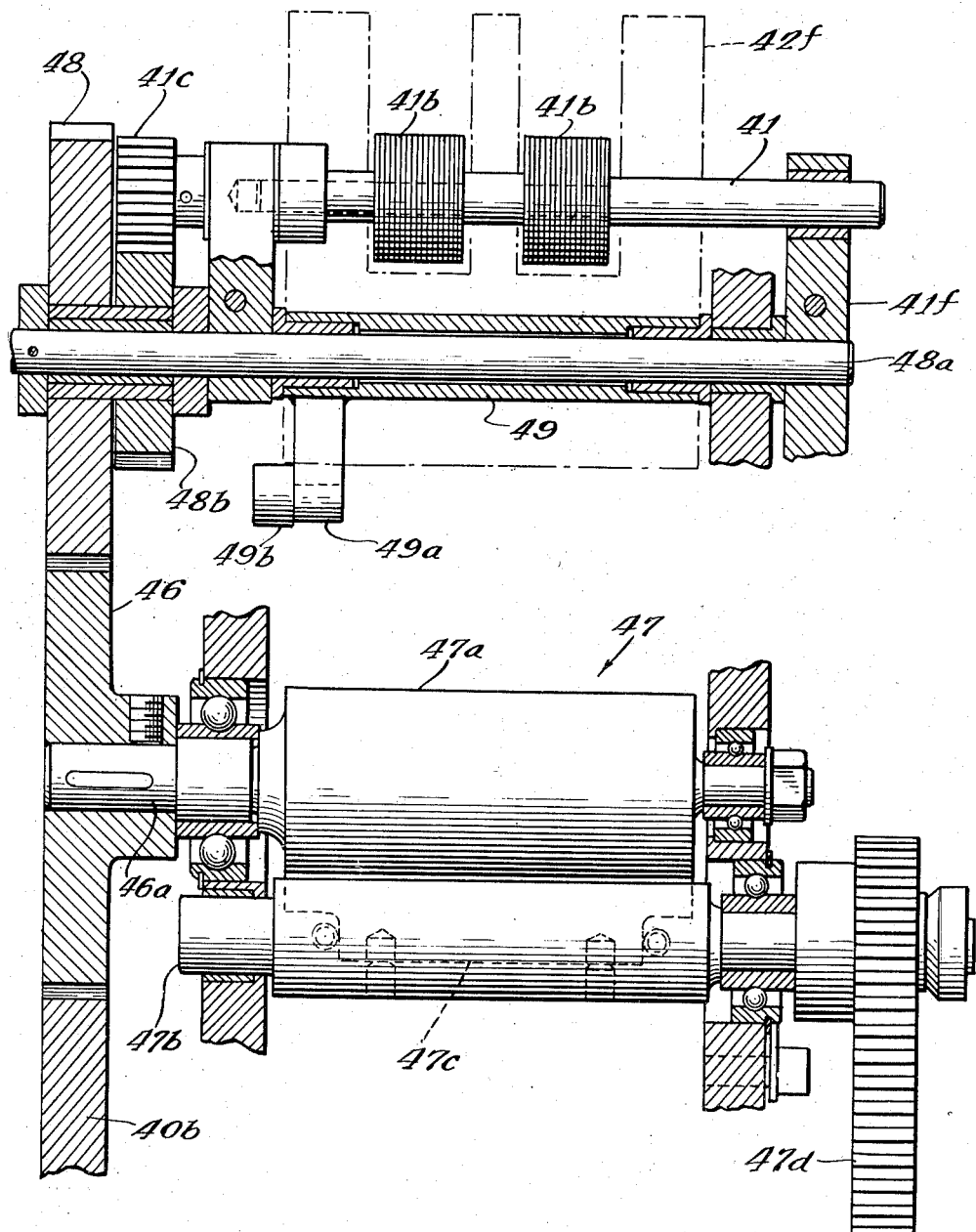

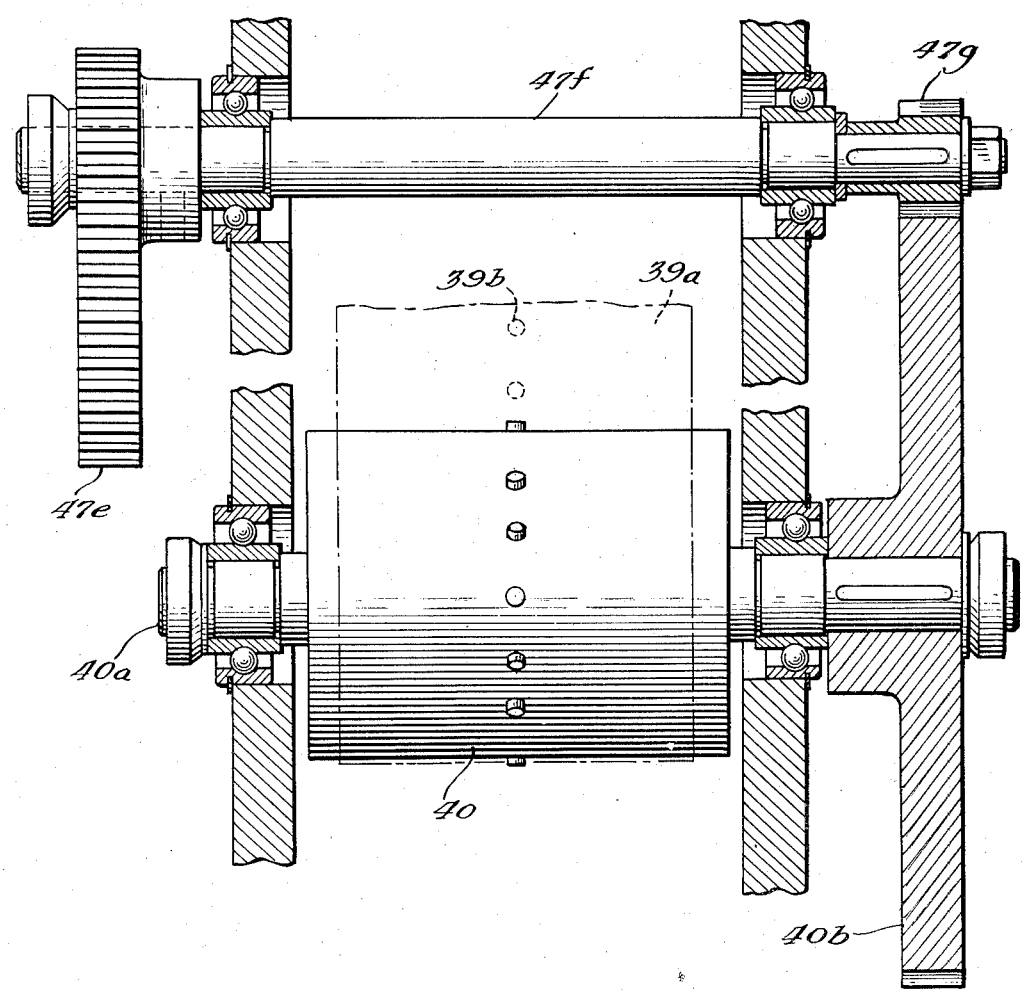

July 15, 1958 E. J. SARRING ET AL 2,843,283
INTEGRATED IMPRINTING AND LABELLING MACHINE
Filed Jan. 3, 1957 18 Sheets-Sheet 10
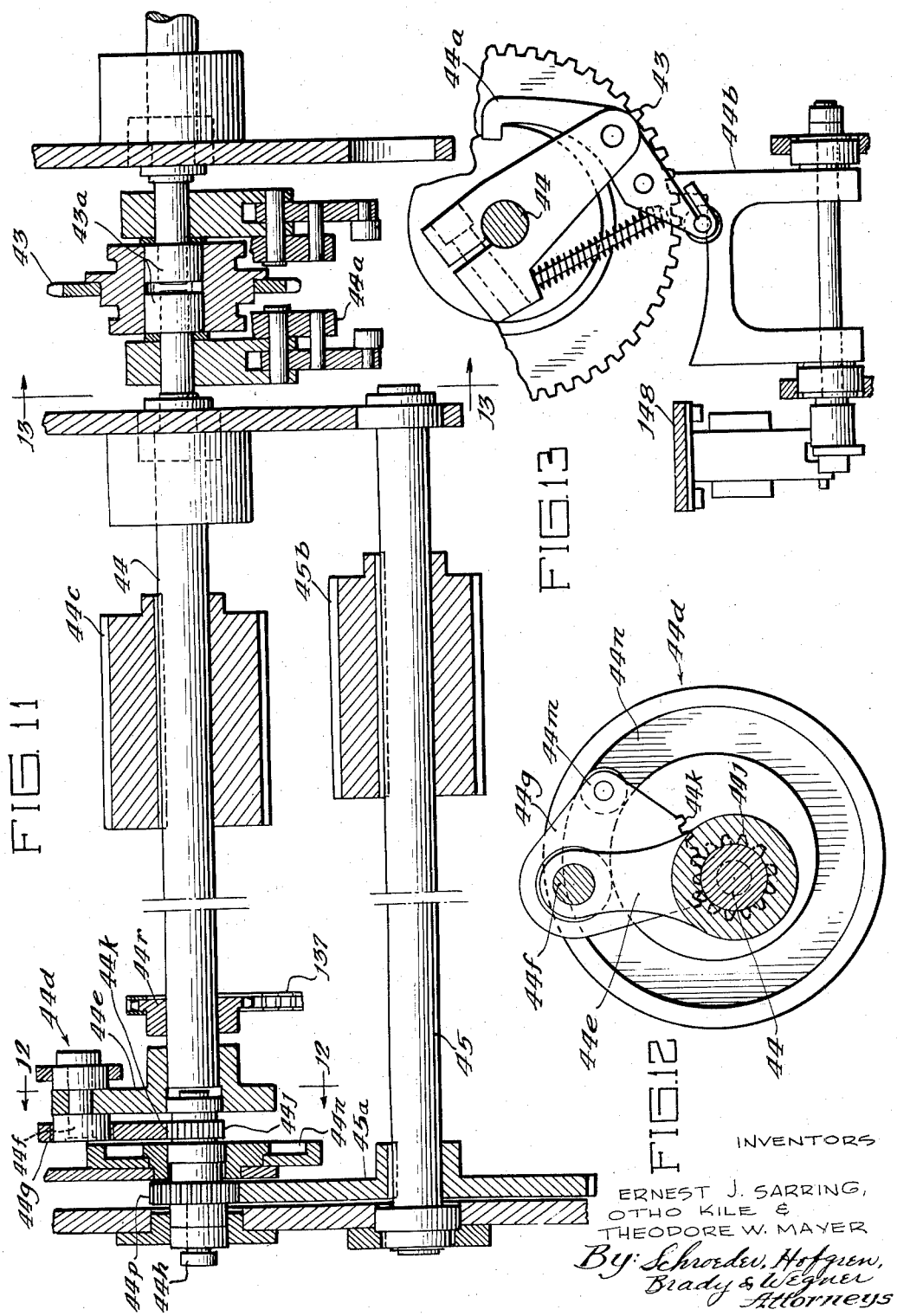
INVENTORS
ERNEST J. SARRING,
OTHO KILE &
THEODORE W. MAYER
By: Schroeder, Hofgren,
Brady & Wegner
Attorneys

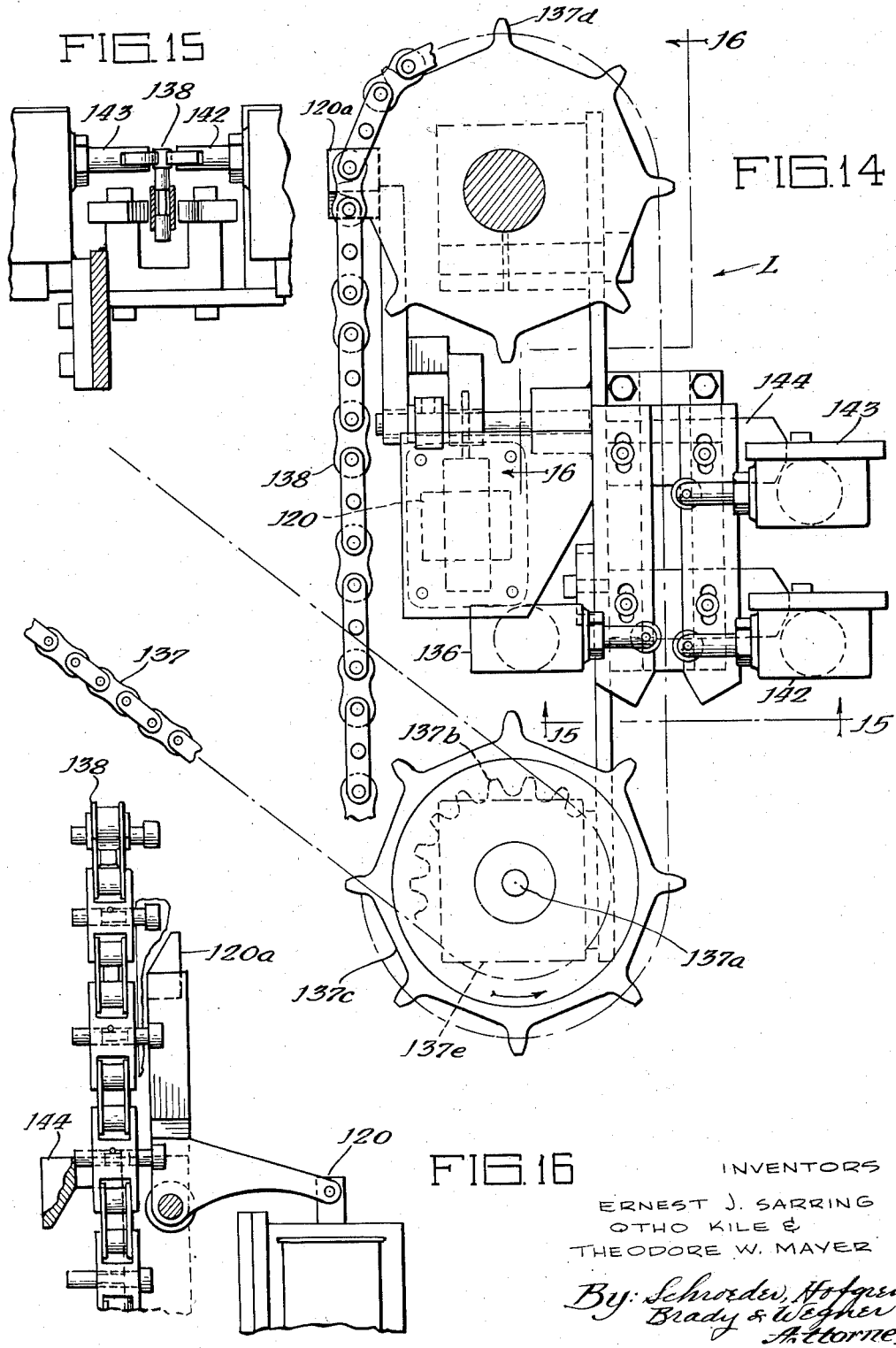

July 15, 1958 E. J. SARRING ET AL 2,843,283
INTEGRATED IMPRINTING AND LABELLING MACHINE
Filed Jan. 3, 1957 18 Sheets-Sheet 12

INVENTORS
ERNEST J. SARRING,
OTHO KILE &
THEODORE W. MAYER

By: Schroeder, Hofgren,
Brady & Wegner
Attorneys

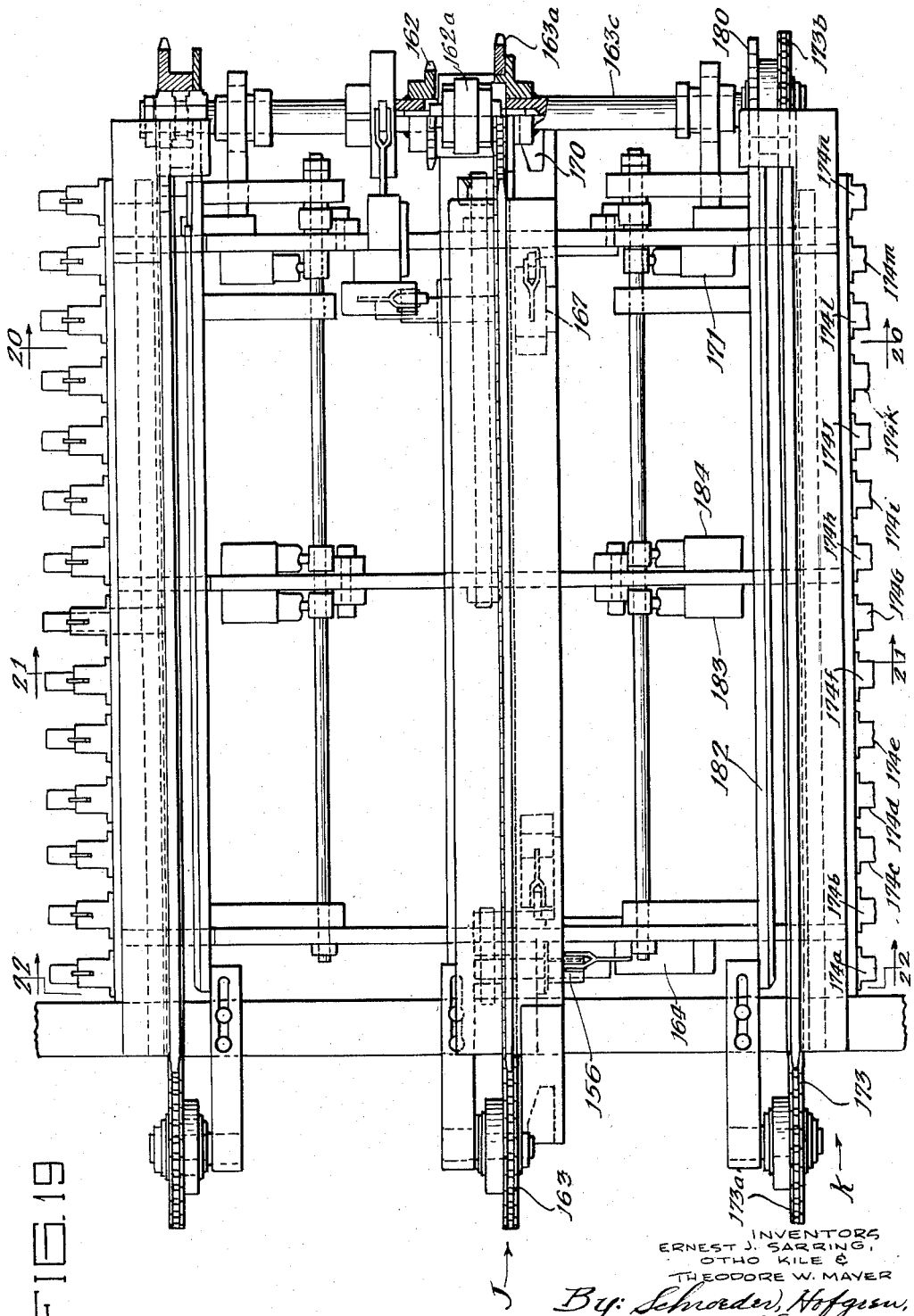

July 15, 1958 E. J. SARRING ET AL 2,843,283
INTEGRATED IMPRINTING AND LABELLING MACHINE
Filed Jan. 3, 1957 18 Sheets-Sheet 14

INVENTORS
ERNEST J. SARRING,
OTHO KILE &
THEODORE W. MAYER

By: Schroeder, Hofgren,
Brady & Wegner
Attorneys

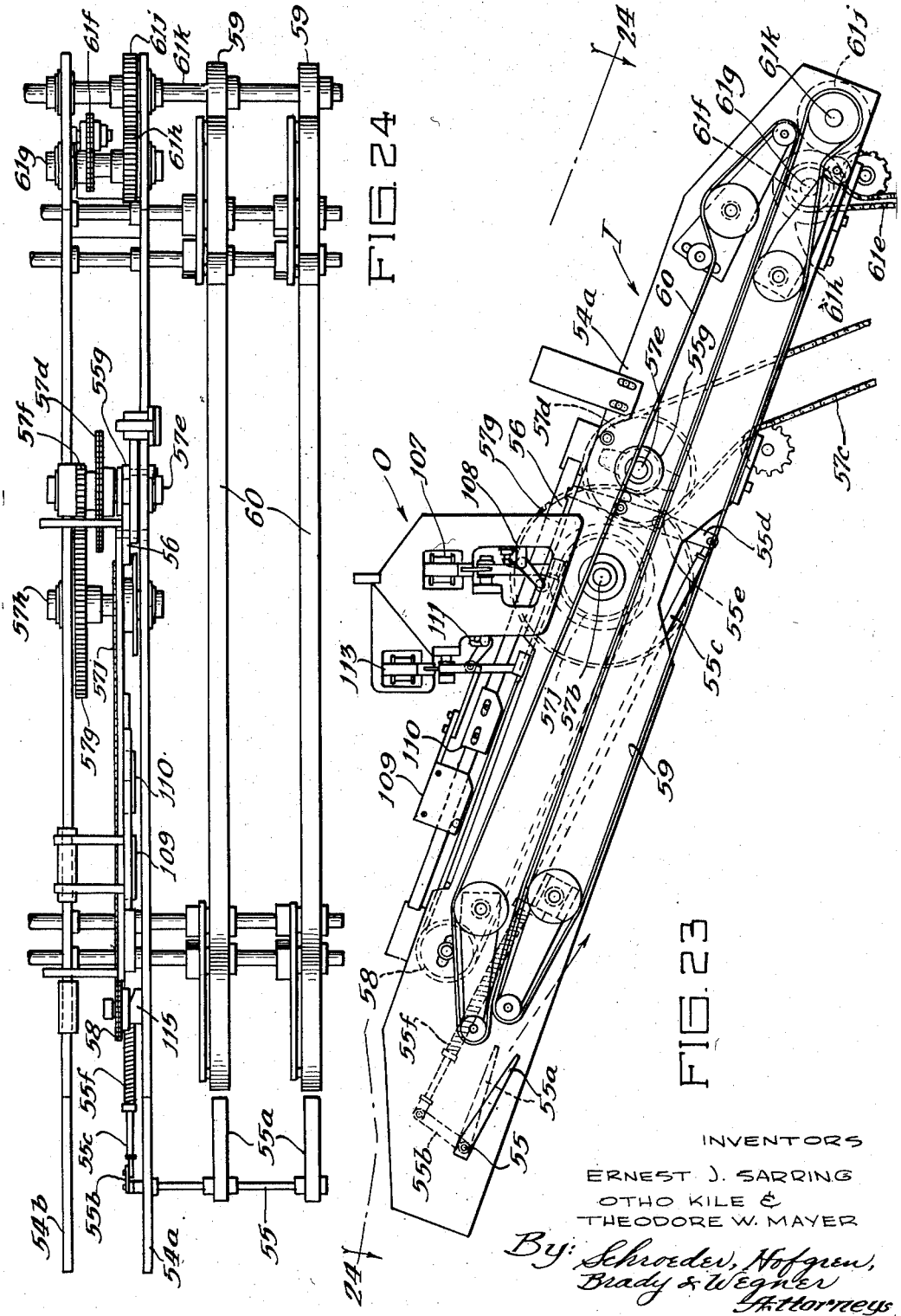

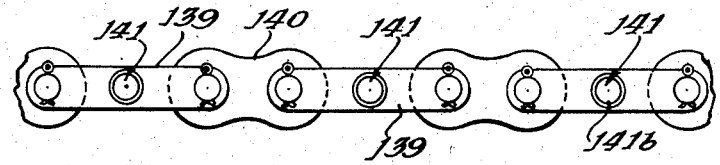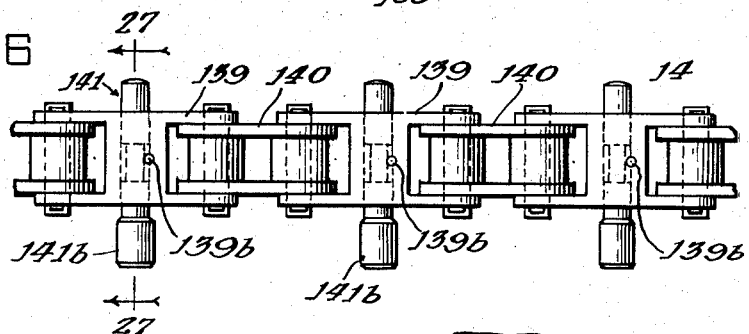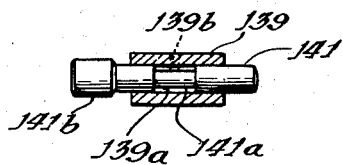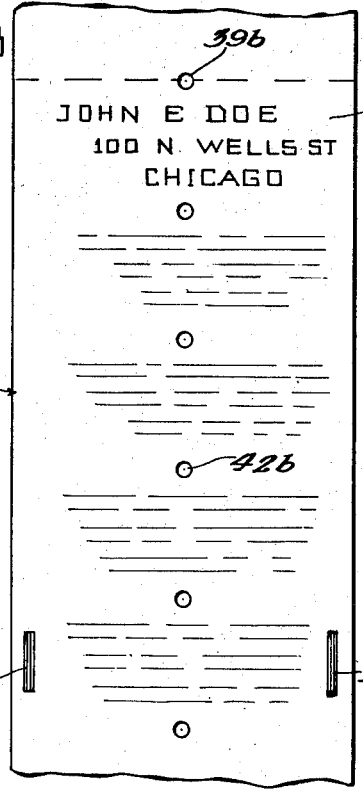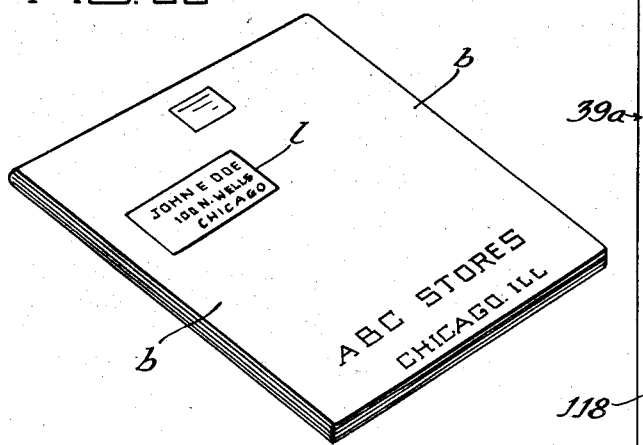

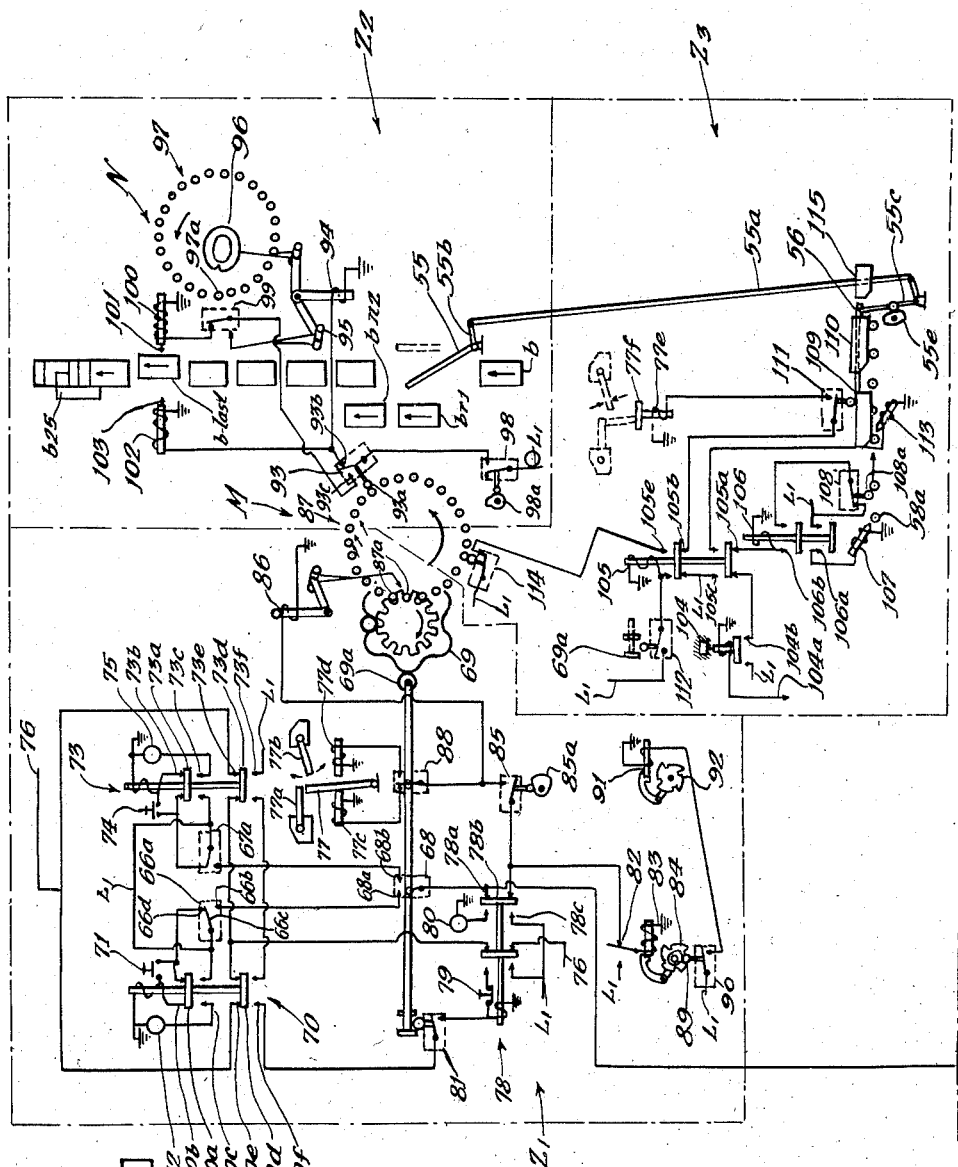

July 15, 1958  E. J. SARRING ET AL  2,843,283
INTEGRATED IMPRINTING AND LABELLING MACHINE
Filed Jan. 3, 1957  18 Sheets-Sheet 18

INVENTORS
ERNEST J. SARRING,
OTHO KILE &
THEODORE W. MAVER
By Schroeder, Hofgren,
Brady & Wegner
Attorney

United States Patent Office 2,843,283
Patented July 15, 1958

2,843,283

INTEGRATED IMPRINTING AND LABELLING MACHINE

Ernest J. Sarring, Willow Springs, Otho Kile, Homewood, and Theodore W. Mayer, Chicago, Ill., assignors to R. R. Donnelley & Sons Company, a corporation of Delaware Application January 3, 1957, Serial No. 632,281

27 Claims. (Cl. 216—1)

This invention relates to a combined imprinting and labelling machine arranged to receive identical books from a saddle stitcher and trimmer and continuously deliver to a packing table groups of books having successively different imprints and/or different distribution indicia.

Books leave a saddle stitcher and trimmer in stacked pairs; and must be "unstacked" so that they may be passed seriatim through the imprinting and labelling machine. Unstacking may conveniently be performed on a machine such as that disclosed and claimed in Kile Patent 2,721,-644, issued October 25, 1955.

The imprinting portion of the machine which serves to imprint successively and continuously a series of books, such as catalogs, with different dealers' names and addresses on one cover, and perhaps a specialized dealer advertisement on the other cover, is substantially similar to that disclosed in co-pending application of Otho Kile, Serial No. 451,502 filed August 23, 1954 (hereinafter referred to as "the Otho Kile Disclosure"). Briefly, the imprinting portion of the present machine receives books seriatim from the unstacker in precisely spaced relationship and carries them over a pair of rotating imprinting cylinders for imprinting the front and back covers of the books. Associated with each imprinting cylinder are two movable imprinting rollers which are so adjusted and coordinated that either may print in the same identical space on the front or back cover of the book, as the case may be. Each imprinting roller is adapted to receive a rubber printing plate suitable for use with a quick-drying ink. Each imprinting roller has an imprinting position and an idle position, and only one imprinting roller associated with each cylinder is in its imprinting position at any given time. Both rollers ordinarily rotate at all times, but the idle roller may be manually stopped by disengaging a synchronous clutch, and may be manually swung out to a position where the imprinting plate may be readily changed. Thus, the new imprinting plate for a succeeding dealer's imprint run may be set up on the idle imprinting roller while the other roller is working. The idle roller may then be swung back and the synchronous clutch re-engaged to start operating it in synchronization with the working roller. The operation of switching imprinting rollers is termed herein a "dealer change."

From the imprinting portion of the machine the books are delivered to a labelling portion wherein suitable labels, such as for mailing purposes, may be affixed to the books as desired. The labeller is arranged so that alternatively all of a given dealer's books (i. e. an entire imprint run) are labelled, none of a given dealer's books are labelled, or a portion of a given dealer's books are labelled and the remainder thereof are not labelled.

Subsequent to passing through the labelling portion of the machine, the books are delivered in shingled relationship to a packing table; and in order that the packers may keep track of the individual imprint and label runs, as well as the number of books within a run, suitable deflector mechanisms are provided at the outfeed end of the machine which act to kick one end of every 25th book in a given imprint or label run toward the outside of the machine, and the last book in any imprint or label run toward the inside of the machine. This serves as a signal to the packers so that they may pick up the books readily in groups of 25 for suitable packaging; and to advise them of the end of a particular dealer imprint run or label group run.

In order that the machine may run continuously and substantially automatically, several automatic control means are utilized; including a pair of pre-selected counters arranged to count the books entering the imprinting machine and, through suitable control means, to effect a dealer change whenever a pre-selected count terminates when the last book of a given run is not to be labelled. To effect a dealer change when the last book of the run is labelled, a suitable signal means is associated with the labels themselves to trigger the transfer mechanism. As there are 13 books serially disposed between the counters and the labelling position, it is necessary that control means be provided for assuring that the labelling and imprinting function are correlated and that the books and labels are maintained in a 1 to 1 relationship. This problem is considerably complicated by the fact that books may be missing in the series on account of any of several common malfunctions in the printing, saddle stitching or trimming operations; so that the number of cycles of machine rotation or operation is not directly correlated with the number of books passing therethrough. The problem of effecting the necessary accurate coordination is a very difficult one, and one which has heretofore not been satisfactorily solved in the art.

The principal object of this invention, therefore, is to provide a combined imprinting and labelling machine arranged to receive books from a saddle stitcher and trimmer, and automatically and continuously imprint, label, and deliver said books to a packing station grouped in accordance with the imprints and labels thereon.

The invention is illustrated in a preferred embodiment in the accompanying drawings, in which:

Fig. 3 is a generally schematic longitudinal sectional view of the labelling portion of the machine, parts being omitted for clarity;

Fig. 4 is a generally schematic longitudinal sectional view of the delivery end of the machine, parts being omitted for clarity;

Fig. 5 is a schematic representation of a series of books passing through the machine, generally in the form of a flow diagram;

Fig. 6 is a generally schematic longitudinal sectional view of a portion of the labelling mechanism on an enlarged scale, parts being omitted for clarity;

Fig. 7 is an enlarged section taken substantially as indicated along the lines 7—7 of Fig. 6;

Fig. 8 is an enlarged section taken substantially as indicated along the line 8—8 of Fig. 6, showing the label slitting and delivering means;

Fig. 9 is an enlarged section taken substantially as indicated along the line 9—9 of Fig. 6, showing the label drive drum means;

Fig. 10 is an enlarged section taken substantially as indicated along the line 10—10 of Fig. 7, showing the label bursting means;

Fig. 11 is an enlarged section taken substantially as indicated along the line 11—11 of Fig. 3, showing the labelling mechanism drive means;

Fig. 12 is a section taken substantially as indicated along the line 12—12 of Fig. 11, showing the pulsating drive portion of the labelling mechanism drive means;

Fig. 13 is a fragmentary section taken substantially as indicated along the line 13—13 of Fig. 11, showing the clutch of the labelling mechanism drive means;

Fig. 14 is a fragmentary vertical elevation of the labeller memory device, with certain parts omitted for clarity;

Fig. 15 is a fragmentary section taken substantially as indicated along the line 15—15 of Fig. 14;

Fig. 16 is a fragmentary section taken substantially as indicated along the line 16—16 of Fig. 14;

Fig. 19 is an enlarged fragmentary section taken substantially as indicated along the line 19—19 of Fig. 1, providing a top plan of the reference and storage memory devices mounted at the infeed end of the machine;

Fig. 23 is a fragmentary side elevation showing the reject device, which appears in a smaller scale in Fig. 3;

Fig. 24 is a section taken substantially as indicated along the line 24—24 of Fig. 23;

Fig. 25 is an enlarged side elevation of a memory chain of the type used in the labeller memory of Fig. 14 and the reference and storage memory devices of Fig. 19;

Fig. 26 is a plan view thereof;

Fig. 27 is a section taken substantially as indicated along the line 27—27 of Fig. 26;

Fig. 28 is an enlarged, front view of a series of labels for use in the machine, extended in a plane subsequent to being unrolled from a supply roll thereof;

Fig. 29 is an isometric view of an imprinted book with a label affixed thereto; and Figs. 30 and 31 are two parts of an electromechanical schematic representation of the control equipment associated with the machine.

*The machine generally*

Figure 1:
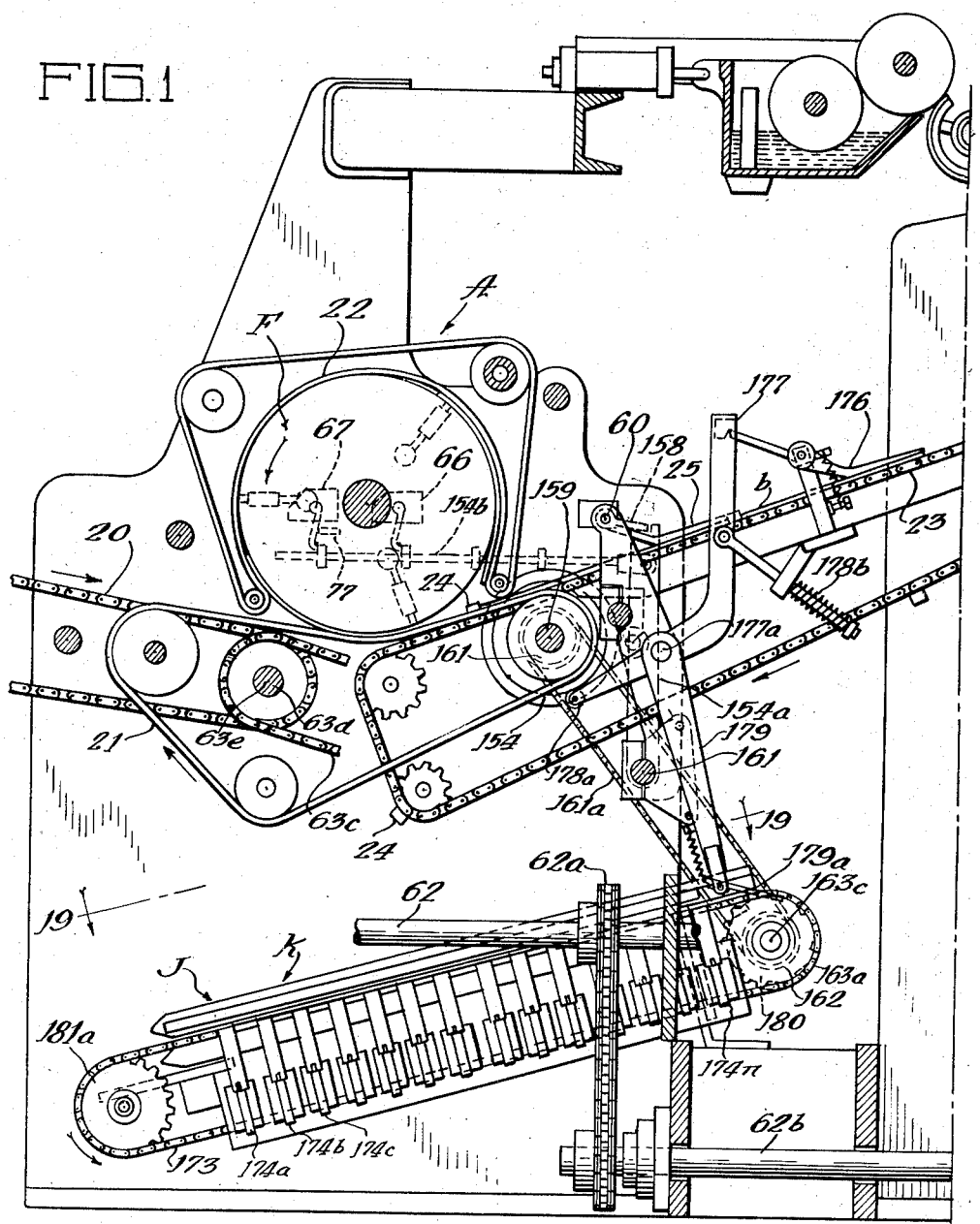
Fig. 1 is a generally schematic longitudinal sectional view of the infeed end of the machine, parts being omitted for clarity.

Books are delivered from the conventional saddle stitcher and trimmer in stacked pairs. To unstack the pairs of books and arrange them seriatim for passing through the imprinting and labelling machine, an unstacker mechanism, preferably of the type disclosed in Kile Patent 2,721,644, indicated generally at "A" in Fig. 1, is provided at the infeed end of the machine.

It should be understood that the books are normally delivered from such a saddle stitcher in two identical streams which move side-by-side and the imprinting and labelling machine is arranged to handle the two side-by-side streams of books. However, as each side of the machine is a duplicate of the other side, the following description will be directed to the mechanism for handling a single stream.

Figure 2:
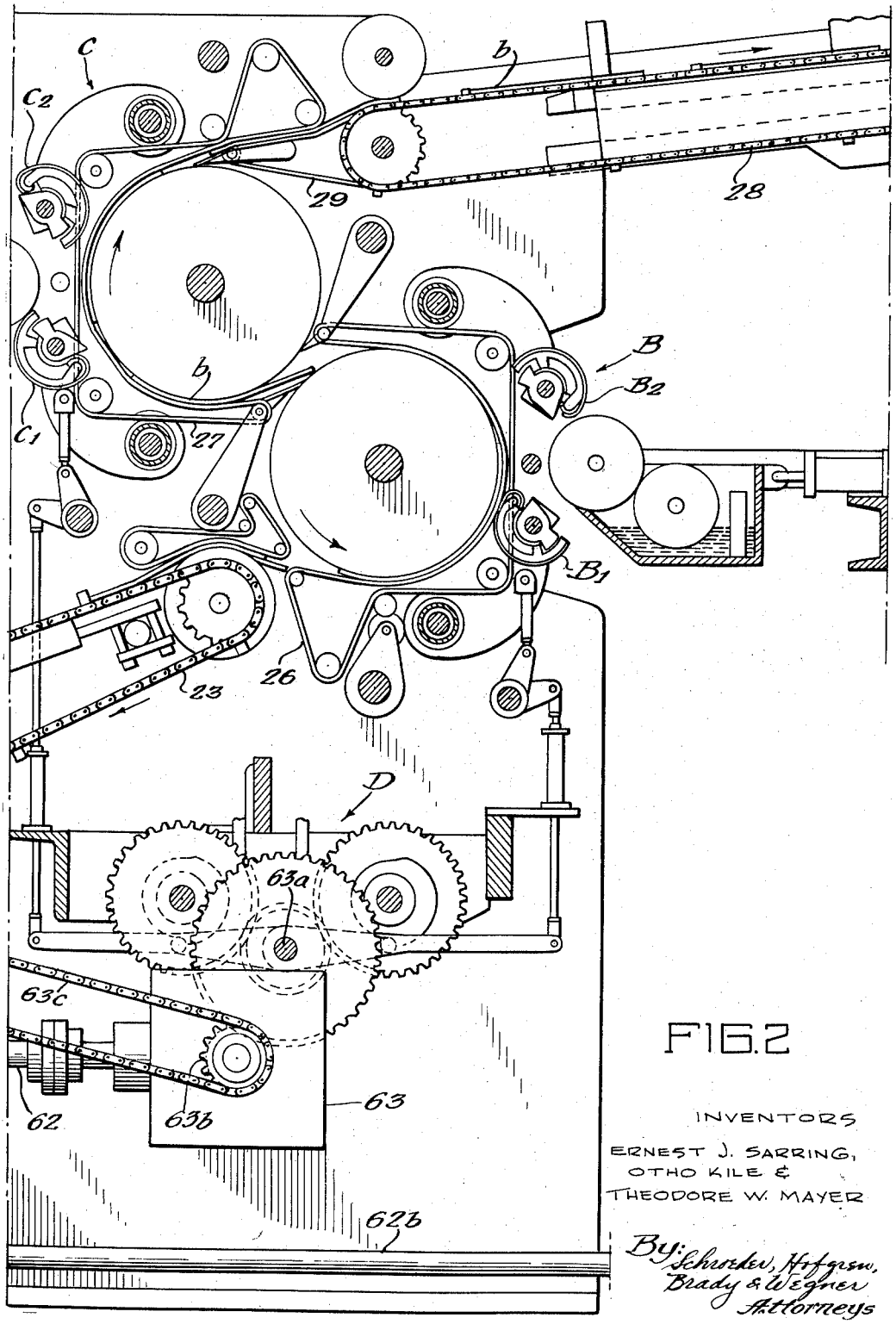
Fig. 2 is a generally schematic longitudinal sectional view of the imprinting portion of the machine, parts being omitted for clarity.
Figure 18:
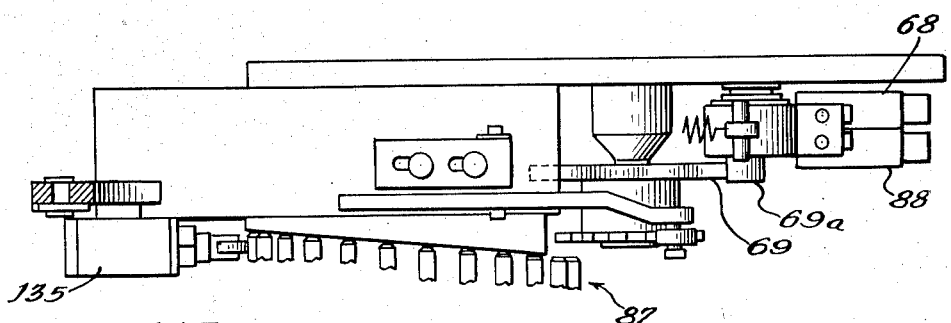
Fig. 18 is a fragmentary section taken substantially as indicated along the line 18—18 of Fig. 17.
Figure 17:
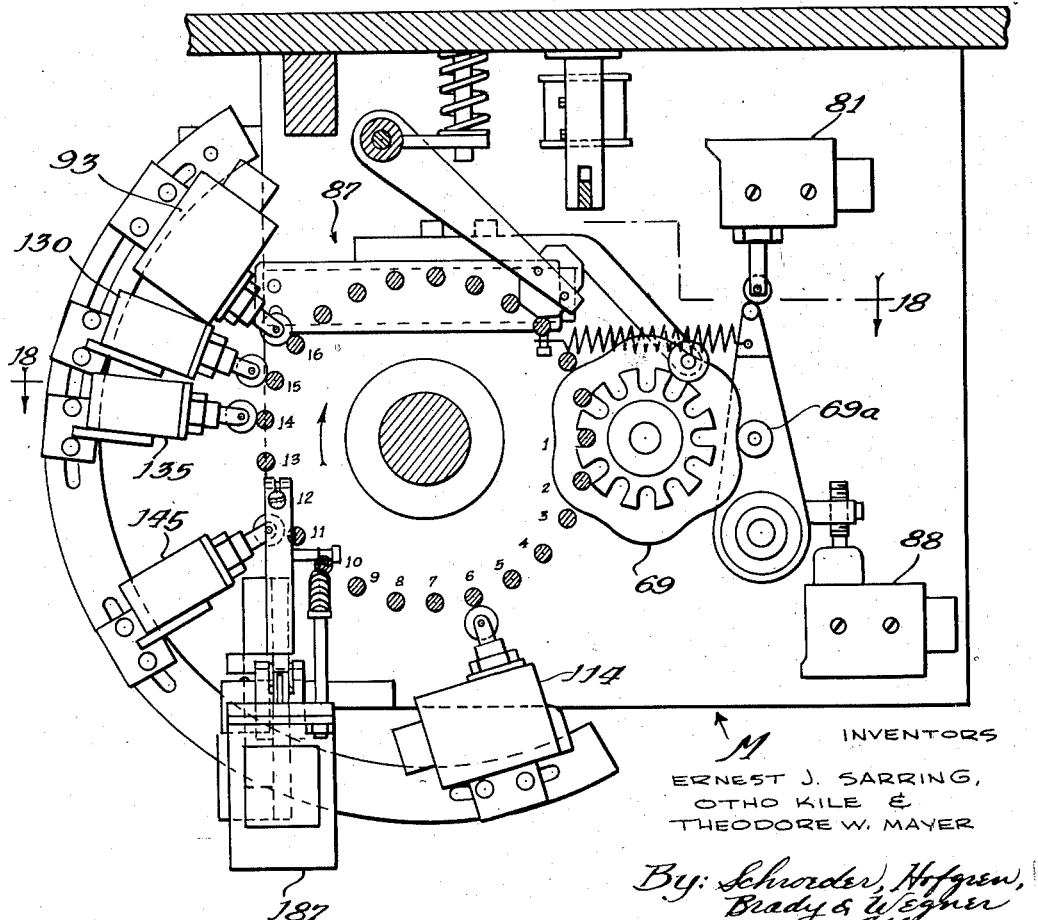
Fig. 17 is a fragmentary vertical elevation of the dealer's change memory device, with certain parts omitted for clarity.
Figure 20:
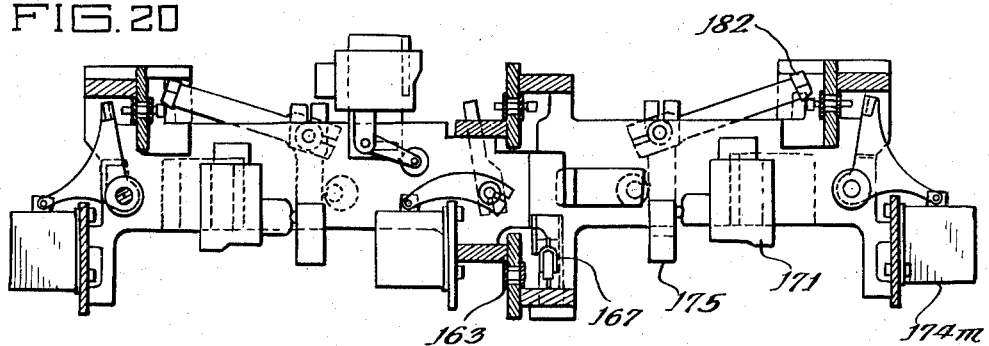
Fig. 20 is a vertical section taken substantially as indicated along the line 20—20 of Fig. 19.
Figure 21:
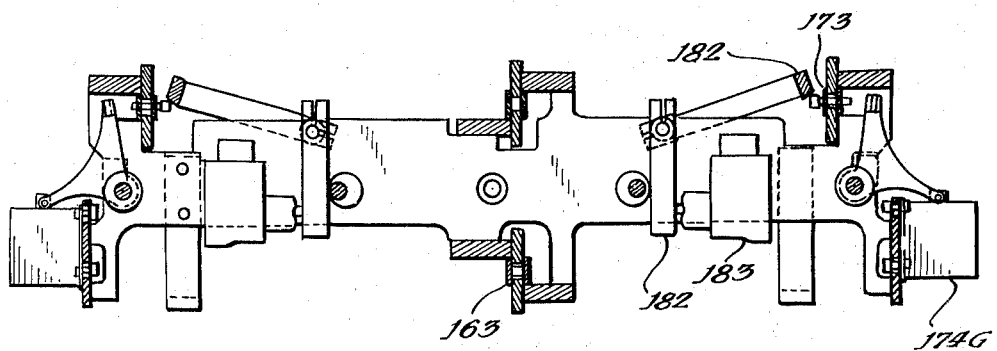
Fig. 21 is a vertical section taken substantially as indicated along the line 21—21 of Fig. 19.

As indicated above, the imprinting portion of the machine is generally similar to the imprinting machine structure disclosed in the Otho Kile disclosure identified above, and a detailed description of the structure thereof will be found in that application. Briefly, however, as seen in Fig. 2, the imprinting structure comprises a front imprinting unit B and a back imprinting unit C which are controlled through suitable linkages by means of an imprinting roller cam mechanism D. The means for effecting the operation of cam mechanism D comprise two alternative structures, namely: (1) a counter mechanism F (Fig. 1); and (2) photo-electric signal means G associated with the labelling mechanism E (Fig. 3).

Whenever the end of a particular run occurs when labels are being applied, a suitable signal marker is placed on the proper label to provide control of the machine at the time of transfer through suitable control means hereinafter described more fully. When the end of a run occurs while no labels are being applied to the books, counter-mechanism F, through suitable control means hereinafter to be described, effects control of the machine and the transfer.

A book deflector mechanism H, as shown in Fig. 4, is provided for offsetting, or kicking, the books either to the inside or outside of the machine for providing desirable packing information to the packing personnel. Deflector mechanism H is substantially similar to the book deflector mechanism shown and described in the Otho Kile disclosure and no further detailed description thereof is deemed necessary in this application.

Whenever the machine is shut down for a long enough time to allow the ink to dry on the imprinting roller, it is desirable to remove the book improperly printed by such dry roller; and this is accomplished by a reject device I which is seen in Figs. 3 and 23. However, only one of the two books in the imprinting position at the time of the machine stoppage is thus improperly imprinted. As it is impossible to predetermine which of the two books is so improperly imprinted, the reject device is arranged at the delivery end of the imprinting section of the machine to remove both books for visual inspection, and selection and discard of the improperly imprinted book.

To correlate properly the functioning of the labelling mechanism and the imprinting mechanism under the various circumstances briefly discussed above, six memory devices are provided as elements of the control equipment. A first such memory device comprises a cycle advanced (advanced in 1 to 1 relationship with the machine), reference memory J disposed below the unstacker mechanism A for operative association with the infeed counter mechanism. The reference memory J is associated with the label signal means G, and with a second memory device, a book advanced (advanced in 1 to 1 relationship with the books passing through the machine) storage memory K. These elements are electromechanically interassociated to assure that the proper number of books for a single dealer run are delivered to the labelling mechanism corresponding to the remaining labels of the run, and to produce the reversal of the imprinting mechanisms B and C when sufficient books have been imprinted on a given dealer run, so as to effect a dealer change. This is done, notwithstanding the fact that a substantial number (in the illustrated embodiment of the invention, thirteen books) of such books are ordinarily disposed serially between the imprinting mechanism and the label applying mechanism at the time of the dealer change.

Associated with the labeller is a third memory device L which is book advanced and which serves to correlate the signal on the label with other machine devices. One such device controlled by the labeller memory L is a fourth memory device, a dealer's change memory M which is actuated by means of the labeller memory L to cancel various circuit arrangements of the control devices. In addition, the dealer's change memory M effects the proper operation of book deflector mechanism H at the end of a given dealer's run.

Also associated with the book deflector mechanism H is a 25 count memory N which operates the deflector mechanism to kick every 25th book outwardly as a signal to the packers. For reasons to be made more clear here following, the dealer's change memory M is cycle advanced and the 25 count memory N is book advanced.

The sixth memory device incorporated in the machine is a cycle advanced reject memory O carried by reject device I. The primary function of this memory is to effect the operation of the reject mechanism 5 cycles after the imprinting position to remove the two suspect books from the main stream when they reach the reject mechanism.

Referring to Fig. 5, a brief description of the functioning of the machine is shown schematically. Thus, a series of sheets or books b are delivered seriatim from unstacker A to the front imprinting unit B, being detected and counted by the counter mechanism F approximately 2 books in front of the front imprinting unit. To assist in the comprehension of the functioning, the books disposed in the machine are numbered from b1 to b16, commencing with b1 directly following the counter F. Thus it may be seen that books b3 and b4 are presently associated with the front imprinting unit B and books b5 and b6 are associated with the back imprinting unit C. As shown, the books pass from imprinting unit C to the labelling mechanism E, approximately 5 books being normally disposed therebetween. In the labeller E, glue is applied as to book b12, and when this book has moved sufficiently through the labeller, a label l is burst from the label supply strip and applied thereto. As shown, mechanism G scans the label 13th from the point of application, so that if the scanned label bears a signal mark indicating the end of a run, and there are no missing books between book b1 now going into the imprinting mechanism and book b13, now about to receive a label, one label would be applied to each of the books numered b1 to b13 until the last label, bearing the signal marking, would be affixed to book b1, ending the label run. It should be noted, however, at this point that as book b1 represents the last of the present run of imprinted books, that the transfer between an imprinting impression member or roller B1 and an idle impression member or roller B2 of the front imprinting unit B and the imprinting impression roller C1 and idle impression roller C2 of the back imprinting unit C must be effected in the imprinting units B and C as soon as book b1 has been imprinted thereby. Thus, the transfer of the imprinting units must occur a substantial number of cycles before the last book of the run is labelled. It is the function of the memory devices described above to take into consideration the fact that the imprinting unit is physically separated a substantial number of book spaces from the labelling unit, and thus to assure that the proper number of books are imprinted in correlation with the remaining number of labels to be affixed thereto. Further, as books may be missing in the series, it is necessary that these memory devices remember that such a book is missing, having been given this information by the counter mechanism F, to assure that the books and labels are maintained to a 1 to 1 relationship.

After the books have been properly labelled, they are passed to the packing or delivery table of the machine, past the book deflector mechanism H where the proper book may be kicked to the right or left, as discussed above, to signal the packers.

A brief description of the various mechanisms included in the machine having been provided above, a more detailed disclosure of each of these mechanisms is made here following.

Unstacker and conveyor

As indicated above, the unstacker mechanism is described in detail in the Otho Kile Patent No. 2,721,644. It is sufficient for understanding of the present machine to note that, as seen in Fig. 1, books b are delivered from a trimmer (not shown) in spaced stacks of 2 on a delivery chain 20 to an unstacker belt 21, which passes them into operative relationship with an unstacker drum acting to pick up the top book of the pair and insert it into an empty space on belt 21 behind the next book stack following the book stack from which it was separated. From the unstacker the books are delivered seriatim onto an infeed conveyor chain 23 which is provided with suitably spaced lugs 24 to keep the books in their proper position with respect to one another. As the books pass along on chain 23 they move under a counter lockout rider finger 25 which senses the presence or absence of a book in the space and feeds this information to the counter mechanism F.

The books are delivered from the end of infeed chain 23, as seen in Fig. 2, onto a feed belt 26 associated with the front imprinting unit B. From belt 26 the books are next delivered to a feed belt 27 associated with the back imprinting unit C. From feed belt 27 the books are delivered to a transfer chain 28 by means of an intermediate belt 29.

Referring now to Fig. 3, the books are delivered from the transfer chain 28 between a pair of coacting labeller belts 30 and 31 of a labelling mechanism E for attachment of a label thereto as desired. The books pass from the labeller belts onto outfeed conveyor chain 32 from which, as seen in Fig. 4, they drop onto a rotating delivery belt 33 which feeds them to a delivery chain 34 forming part of a delivery table, indicated generally at 35, of the packing portion P of the machine. Mounted pivotally above the delivery table is a shingling mechanism 36 which acts on the books carried on the delivery chain 34 to pile the books in shingled relationship.

The unstacker, imprinting and packing portions of the present machine are substantially similar to those described in detail in the Otho Kile disclosure. The labelling and book reject portions of the present machine, as well as the interrelated controls which coordinate the imprinting, labelling and reject mechanisms, are not, however, a part of the reference disclosure; and a detailed description thereof follows:

Labelling mechanism E

The function of the labelling mechanism is to unwind a continuous strip of labels from a supply roll, by means of a pinwheel feed engaging holes in the strip, dab a spot of glue in a predetermined area on a book, press the foremost label in the strip onto the spot of glue on the book by means of a rotating labelling arm and burst the attached label from the strip. To facilitate the bursting operation the labels are substantially sheared apart as they approach the labelling point, and the label feed is intermittent, or pulsating, so that the label strip is stationary at the moment a label is attached. The movement of the book and the labelling arm bursts the applied label from the strip. Furthermore, it is necessary to adjust the position of the labels on the books; and for this purpose the label handling elements are laterally adjustable with respect to the book feed; and the longitudinal position of the labels on the books may also be changed.

The labelling mechanism is illustrated in Figs. 3 and 6 to 13, inclusive.

As seen in Figs. 3 and 6, the labeller belts 30 and 31 are carried on suitable drums which include a labeller drum 37, a sensing drum 37a, and a terminal drum 37b which is carried on a labeller drive shaft 38. As the books are carried around the drums by the belts 30 and 31, a separate label feed mechanism is acting to move a strip of labels from a supply roll toward a labelling point adjacent the labelling drum 37. Longitudinal variation of the position of labels on the books is obtained by relative adjustment of sensing drum 37a and a compensating drum 37c, to lengthen or shorten the run of belts 30 and 31 ahead of labelling drum 37.

A roll of labels 39 is carried on a suitable support beneath the labelling mechanism, and from the roll 39 a continuous strip of labels 39a, which are seen in Fig. 28 to have central holes 39b between each adjacent pair of labels, is drawn upwardly by a pinwheel feed 40 mounted on a shaft 40a (Fig. 9), and by a pair of cooperating label strip feed wheels 41a and feed brushes 41b which are mounted close to the labelling point as seen in Figs. 6 and 10. To facilitate attaching labels to books and bursting them from the strip 39a, the label feed is pulsating, and a pair of clamping brakes 42a and 42b are provided to intermittently grip the label strip in timed relationship with the slow portion of the pulsating drive so that the label strip is stationary at the moment that a label is attached. This also provides for starting and stopping of the labelling mechanism under reduced inertia.

The drive for the label feed is best seen in Figs. 7 to 13, and as seen in Fig. 11 it includes a drive sprocket 43 which is mounted in the longitudinal vertical center plane of the machine and is connected by a chain (not shown) with a sprocket on labeller drive shaft 38. The sprocket 43 is journalled on bearings 43a mounted on shaft 44; and since the label drive must be stopped, for example when a book is missing, the shaft 43a drives a distributing shaft 44 through a one point clutch 44a. The clutch is normally engaged as seen in Fig. 13, but may be disengaged by a suitable control mechanism through the operation of a lockout 44b.

Keyed on the shaft 44 is a wide gear 44c which provides the power input for the constant speed components of the unit, including a glue applicator system and labelling arm which will be described. At the outboard end of shaft 44 is a cam drive, indicated generally at 44d, to convert the constant rotation of shaft 44 to a pulsating drive of a shaft from which the pulsating label feed and slitter feed are driven. As seen in Figs. 11 and 12, the cam drive 44d includes a crank arm 44e on shaft 44 which has a crank pin 44f supporting a gear segment 44g. A stub shaft 44h is mounted coaxially with the shaft 44 and carries a toothed gear 44j which meshes with the gears 44k of gear segment 44g. A cam follower pin 44m on the gear segment 44g engages with a cam track 44n of a fixed cam so that as shaft 44 rotates, the gear segment 44g reciprocates 30 degrees on the crank pin 44f, and causes stub shaft 44h to move alternately more slowly and faster than shaft 44, to produce a pulsating drive.

An output gear 44p on stub shaft 44h meshes with a gear 45a on the shaft 45 which also carries a wide gear 45b which is the pulsating output gear for all pulsating elements of the labeller. Wide gear 45b engages an intermediate gear 46, which is seen in Fig. 8 to be on a shaft 46a for the backing roller 47a of a slitter mechanism 47; and gear 46 in turn meshes with a pinwheel feed gear 40b which is mounted on the shaft 40a for the pinwheel feed 40. Thus, the pinwheel feed 40 is driven pulsatingly in accordance with the movement of pulsating drive shaft 45.

The gears meshing with wide gears 44c and 45b are narrower, and may slide in mesh with said gears for lateral adjustment of the label handling elements.

The pulsating drive is also transmitted from gear 46 to a gear 48 which is journalled on a clamping brake support rod 48a. Pinned to gear 48 is a brush and roller drive gear 48b which is seen in Fig. 10 to mesh with a gear 41d which in turn drives rollers 41a through gear 41e, and also with gear 41c to drive brushes 41b. Thus, the label strip feed wheels 41a and brushes 41b are driven pulsatingly in time with the pinwheel feed.

Brushes 41b are seen in Fig. 10 to be mounted on a bell crank 41f which is pivoted on brake support rod 48a so as to permit adjustment of the pressure between feed wheels 41a and brushes 41b.

The final component of the label feed is the pair of clamping brakes 42a and 42b which are seen in Fig. 10 to be positioned in juxtaposition with the feed wheels and brushes. The clamping brakes 42a and 42b have diverging lower end portions 42c and 42d between which the label strip 39a is fed, and clamping tips 42e and 42f, respectively. The guide 42a is fixed, while the guide 42b has a mounting boss 49 which is pivoted on shaft 48a and has a cam follower arm 49a with a cam roller 49b which is held against a cam 49c by means of a tension spring 49d. The cam 49c is carried on a shaft 50a which is also provided with a drive gear 50 meshing with the constant drive gear 44c (Fig. 11). Thus gear 50 and cam 49c are rotated at a uniform rate of speed, and rotation of the cam 49c acts through the cam arm 49a to rock the clamping brake 42b on support rod 48. The timing is such that the clamping brakes close on the label strip 39a as the pulsating strip feed reaches its lowest speed, completely stopping movement of the label strip immediately behind the label at the labelling point.

Associated with the label feed is the label slitter mechanism 47, previously mentioned, which is best seen in Figs. 6 and 8. Parallel to slitter backing roll 47a is a shaft 47b having a knife blade 47c which may bear on the backing roll as it rotates. The knife blade drive is effected through an elliptical gear 47d on the blade shaft 47b which meshes with an elliptical gear 47e on one end of a shaft 47f (Fig. 9) which also carries a pinion 47g meshing directly with pinwheel drive gear 40b.

The purpose of elliptical gears 47d and 47e is to alter the acceleration and deceleration characteristics of the knife rotation so that while it is synchronized with the pulsating feed of the label strip, the linear velocity of the knife edge at the point of the slit may be substantially decreased, thereby allowing the use of a much thicker and stronger knife.

While the label strip is fed toward the labelling point by the pulsating drive, the books are prepared to receive the labels by the action of a rotating glue applicator 51 which transfers a dab of glue from a glue supply system 52; and a rotary labelling arm 53 at the labelling point presses the endmost label $l$ of label strip 39a into the glue on the book at the labelling point. Both the glue applicator 51 and labelling arm 53 must be driven constantly so that their tips move at the same speed as the book carrying belts 30 and 31; and thus they are driven from the constant speed drive shaft 44 and gear 50. Drive for glue applicator 51 is seen in Fig. 7 to be conveyed from gear 50 through an intermediate idler 51a to a large gear 51b which is pinned to a smaller gear 51c, which in turn meshes with a pinion 51d which is keyed to the shaft which carries glue applicator 51. The drive for labelling arm 53 is directly from gear 50 to a gear 53a on the shaft for labelling arm 53.

Since it is desirable to provide for variation in the pressure which glue applicator 51 exerts on a book $b$, and to provide a yielding pressure to accommodate books of different thickness, the shaft for applicator 51 is mounted on bifurcated arm means 51e of a bell crank which is pivoted on the axis of gear 51c. The other arm 51f of the bell crank is provided with an adjusting screw 51g and a tension spring 51h. When the labeller is inactive the applicator may be moved away from the books $b$ altogether by the action of a solenoid 51j which works against the tension of spring 51h.

Similarly, labelling arm 53 has its supporting shaft mounted in bifurcated arm means 53b of a bell crank which is pivoted on shaft 50a, and the other arm 53c of the bell crank has a spring 53d which urges the labelling arm 53 toward the books $b$.

Adhesive supply mechanism 52 includes an adhesive pot 52a and a glue drum 52b the lower part of which may be immersed in a supply of glue in the pot. A glue drum gear 52c engages a glue drum drive gear 52d which is suitably driven at a constant speed such that the glue drum has a surface speed roughly equal to the tip speed of applicator 51.

Power is transmitted to various parts of the labelling mechanism by a single drive chain in the longitudinal, vertical center plane of the machine. Referring to Fig. 3, this drive chain (which is not shown in the drawings), engages a sprocket on shaft 38; the sprocket 43 which is seen in Fig. 11 to be coaxial with shaft 44f, thus powering the uniform speed shaft 44 and pulsating shaft 45; wraps around a sprocket on the shaft which carries glue drum drive gear 52d so as to power the glue drum; engages a sprocket on the shaft for labelling drum 37; wraps around a sprocket on a shaft 28a which supports the last sprocket of the book carrier chain 28; and returns to the first named sprocket.

Reject device I

As seen in Fig. 3, the reject device is mounted above the labeller E and outfeed chain 32. If, during a run, the machine is stopped long enough for the ink to dry on the imprinting rollers, either one of two books which was in the imprinting device during the stoppage may be defective if the books are imprinted only on the front, or any two of four books if they are imprinted front and back. After such a stoppage the reject device automatically withdraws from the machine ahead of the labeller either two or four books and bypasses them directly to the delivery table, where an operator may throw out the defective book or books, and feed the good ones back into an empty space in the stream ahead of the labeller if necessary, or add them to the books for packing. The reject device is readily adjustable for elimination of either two or four such books.

When one or two books are withdrawn by the reject mechanism it throws off the count on the particular imprint or label run; and this is compensated by correcting the count in a manner which will be described in connection with Reject Circuit Z-3.

As seen in Figs. 23 and 24 the reject mechanism I has a pair of spaced longitudinal frame members 54a and 54b which are supported on suitable brackets; and mounted on member 55a adjacent transfer chain 28 is a rock shaft 55 carrying flippers 55a which occupy a normal position generally flush with the chain 28 so that books may ride over the flippers. A rocker arm 55b secured to rock shaft 55 is connected by an actuating link 55c to an operating lever 55d pivoted on a shaft 55e.

The flippers 55a are held in normal position by a locking bar 56 which is pivotally mounted on top of frame members 54a and 54b and engages the upper end of lever 55d. Movement of locking bar 56 is controlled by reject memory device O; and when the locking bar 56 is disengaged from lever 55d a compression spring 55f on link 55c moves the link longitudinally to the left as seen in Fig. 23 and rocks the flippers 55a into a reject position with their tips above the level of books on chain 28 to deflect the next book into the reject mechanism. This movement of link 55c also brings lever 55d into contact with a rotating cam 55g which acts through the lever and link to move the flippers to normal position once for every machine cycle.

The flippers 55a deliver the rejected books between lower belts 59 and upper belts 60 which are carried on suitable pulleys to extend lengthwise of the reject device, and the belts are driven at relatively high speed to throw the rejected books onto the top of the group of shingled books normally delivered from the labeller, where they may be inspected.

Machine power supply

The machine is driven by an electric motor (not shown) through a power distribution system which may be seen in Figs. 1 to 4. The motor drives an input shaft 62 (Figs. 1 and 2) in the lower portion of the machine; and as seen in Fig. 1, below the unstacker and infeed is a chain drive unit 62a which transmits power from shaft 62 to a parallel shaft 62b extending along one side near the bottom, and substantially the entire length of the machine (Figs. 1, 2 and 4).

As seen in Fig. 2, shaft 62 acts through a reduction gear unit 63, and suitable connecting gears, to drive an intermediate shaft 63a of the imprinting cam mechanism D; and the unit 63 has a drive sprocket 63b which acts through a chain 63c and a sprocket 63d on a shaft 63e (Fig. 1) to drive the unstacker and the infeed.

As seen in Fig. 4, the end of shaft 62b at the delivery end of the machine is connected through a coupling to a gear unit 64 having a drive sprocket 64a which acts through a chain 64b to drive a sprocket 64c on an intermediate power distribution shaft 64d. Chain 64b may be tensioned by an idler sprocket 64e.

The shaft 64d provides the drive for the labeller E, outfeed chains 32, book deflector mechanism H and associated control mechanisms including the dealer change memory M, the 25 count memory N, and the reject memory O.

Thus, to drive reject memory O, a sprocket 64f on shaft 64d carries a chain 64g which is also trained around a sprocket 64h on an input shaft 57 for the outfeed chain 32. Outfeed chain 32 is also trained around a sprocket 38a on the shaft 38 (Fig. 3), which extends across the machine and also carries the terminal drum 37b of the book conveyor system for the labeller E. A sprocket 57b on input shaft 57 (Figs. 3 and 4) acts through a chain 57c and a sprocket 57d to drive a shaft 57e in the reject mechanism (Figs. 23 and 24) bearing a gear 57f which meshes with a gear 57g on a shaft 57h which also has a sprocket 57j on which is trained is a reject memory drive chain 58.

The manner in which the drive for the labeller is carried from shaft 38 has already been described.

In addition, there are two components which are best driven at a higher speed; these being the reject belts 59 and 60 (Figs. 23 and 24), and the delivery belt 33 (Fig. 4). Accordingly, a separate electric motor 61 (Fig. 4) is provided to furnish the faster drive.

To drive the reject belts 59 and 60, an output drive sprocket 61a of motor 61 drives a chain 61b trained around an intermediate sprocket 61c. A sprocket 61d coaxial with pulley 61c mounts a chain 61e which engages a drive sprocket 61f on a shaft 61g in the reject mechanism (Figs. 23 and 24). Also on 61g is a driver gear 61h meshing with a driver gear 61j keyed on a shaft 61k having pulleys for the lower reject belts 59. The upper belts 60 are driven frictionally off the lower belts.

From intermediate sprocket 61c, one run of chain 61b passes around a tensioning idler 65 and over a sprocket 65a on a shaft 65b which also carries a gear 65c engaging a gear 65d which is journalled on shaft 57 at the lower end of outfeed chain 32. Keyed to gear 65d is a delivery belt pulley for delivery belts 33.

The control devices and the functioning of the machine.

It is a basic feature of the present machine that a series of books, delivered continuously from a stitcher and trimmer, may be continuously and automatically individualized, both as to imprinting and as to mailing. To effect this coordination, as discussed above, six memory devices are provided for electro-mechanical association with the machine mechanisms and suitable control circuits to be described herefollowing. To aid in the understanding of the structure and functioning of the control elements, an electro-mechanical schematic diagram is provided herewith as Figs. 30 and 31 to which reference will be made in the description of the various individual memory and control devices.

As discussed above, two basic means are utilized for obtaining necessary information to effect the automatic control of the machine. The first of these means comprises a pair of predetermined counters 66 and 67; while the second comprises the photo-electric signal means G. As described in detail in the Otho Kile disclosure, one of the counters, herein designated as 66, may be considered as the presently operating counter and the other of the counters, herein designated 67, may be considered as the idle counter. As shown in Fig. 2 of the drawings, the lower imprinting rollers B1 of the front imprinting unit and C1 of the back imprinting unit are in printing position relative to the books passing along on belts 26 and 27 and thus are associated with the operating counter 66. Thus, imprinting of both front and back covers of the book is anticipated by the illustrated showing of the machine. The upper imprinting rollers B2 of the front imprinting unit and C2 of the back imprinting unit are spaced from the books in an inoperative position and are thus associated with the idle counter 67. If the particular dealer's imprint does not require labels on any of the imprint books, the imprinting mechanism will continue to operate on rollers B1 and C1 until operating counter 66 reaches the predetermined or set count thereon, at which time, by means to be described herefollowing, an automatic transfer to the upper imprinting rollers B2 and C2 would be effected, and at the same time the count of books is automatically transferred from counter 66 to counter 67, so that the books, subsequently imprinted by the upper rollers are counted by the previously idle counter 67, and the previously active counter 66 becomes the idle counter.

Where the present imprint run requires labels on part or all of the books, control information is supplied by the photo-electric signal means G, briefly alluded to above. To simplify the functioning of the machine, whenever labels are to be applied only during a portion of a particular imprint run, the labels preferably are applied during the first part of the run, while the last part of the run is without labels. Assuming that this procedure is followed, there are six possible normal operational changes which may occur in the combined functioning of the imprinting and labelling mechanisms:

First, the machine may be started with both the imprinting and labelling mechanisms operating concurrently.

Second, at the time of an imprint change the labelling mechanism may be stopped, if the next imprint run does not require labels.

Third, an imprint change may occur where the labelling mechanism has been inoperative at the end of the previous run and where no labels are to be applied in the new run, so that the labelling mechanism remains stopped after the imprint change.

Fourth, the labelling mechanism may continue to apply labels at an imprint change where labels are being applied at the end of a first run and the new run also requires labels.

In this situation it is absolutely necessary to maintain a one to one relationship between the books of the run and the labels to be applied thereto, so that when the first book of the new run comes through to the labelling mechanism the first label for the new dealer will be applied to it.

Fifth, if a dealer desires to have his books mailed to different cities, it is desirable to separate automatically the mail going to each city from that going to the others; so the same imprint may be continued but a book in the stream at the packing table is deflected to signal the packers of this label or mailing change.

The sixth operation is the common one of stopping the labelling mechanism when the labels for a given dealer have all been applied and where the remainder of the run is to be made without labels so that the imprinter may run without the labeller.

Figure 31:
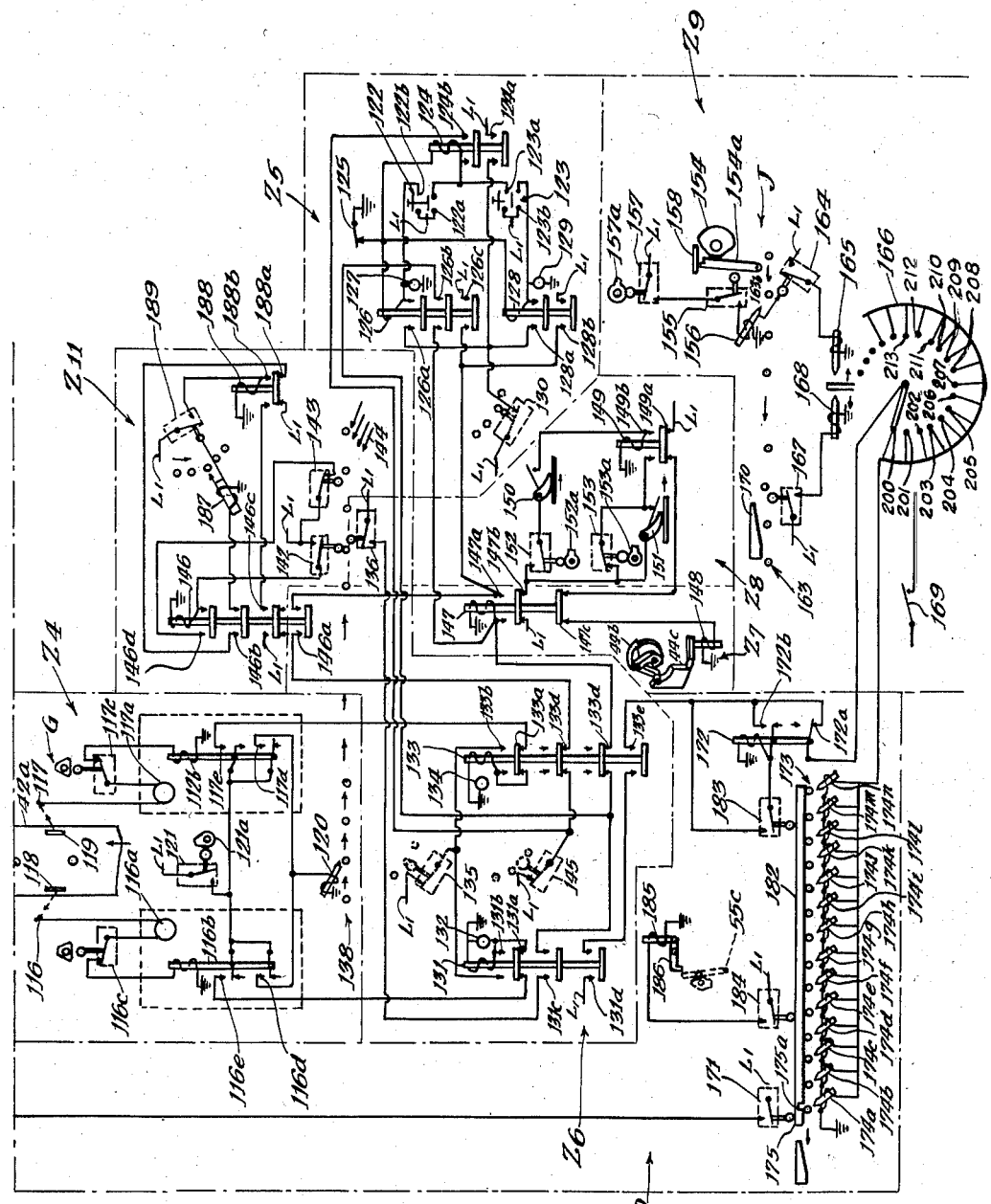

Referring now to Figs. 30 and 31 it may be seen that eleven basic control circuits are provided, designated Z-1 to Z-11 inclusive. Circuit Z-1 is substantially identical to circuits J-1 through J-5 of the Otho Kile disclosure and effects the transfer of the imprinting units at the proper time. Included in this circuit is the predetermined counter control for effecting the imprint change when no labels are being applied at the end of the run. Circuit Z-2 effects the book deflection required for signalling the 25 count and for signalling the end of a given group of labels or the end of an imprint run. Circuit Z-3 controls the reject functioning of the machine. Circuit Z-4 may be designated as the photo-electric pickup circuit and includes the photo-electric signal means G and a pinsetting portion of the labeiler-memory device L.

Circuit Z-5 provides, through use of manually operated pushbutton units, a means for feeding additional information into the controls of the machine for correlation with the information provided by circuit Z-4. The information obtained from circuits Z-4 and Z-5 is fed to circuit Z-6 wherein certain relays are energized or nonenergized depending on the information supplied. This sets up predetermined circuit arrangements for controlling, among other things, the labeller switch circuit Z-7 to start and stop the labelling mechanism E at the proper time or to continue its operational status. Circuit Z-8 includes the means for stopping the operation of the labelling mechanism whenever a book is missing from the stream to preclude the attempted application of glue and a label to an empty book space. Thus circuit Z-8 is associated with circuit Z-7 to stop the labelling mechanism notwithstanding the condition of circuit Z-6 which would otherwise control.

If books were never missing from the series, the labelling and imprinting mechanisms could be properly coordinated by actuating the imprint change circuit Z-1 immediately upon receiving a signal from the photoelectric pickup circuit Z-4. However, because this is not true, circuit Z-9 is provided to correct the information received from circuit Z-4 with reference to the number of books missing. This corrected signal is then delivered to circuit Z-10 which stores the information when books are missing, or which effects an immediate operation of circuit Z-1 to change the imprint if no books are missing. If books are missing and the information is stored, circuit Z-10 effects operation of circuit Z-1 when a sufficient number of additional books have been delivered to the imprinting unit to make up for those originally missing.

*Imprint change circuit Z-1 and deflector circuit Z-2*

As seen in Fig. 30, circuit Z-1 includes a switch 66a in operating counter 66, and a switch 67a in the idle counter 67. Electrical selection of switches 66a and 67a is effected through a selector switch 68, which selector switch is reversed by the action of a Geneva wheel 69 and its follower 69a, to transfer operation of circuit Z-1 from one counter to the other counter at an imprint change.

Considering now the portion of the circuit relating to the operating counter 66, there is provided a four pole, double break, relay 70 having a contact bar 70a arranged for closing alternatively normally open contacts 70b which serve as the relay holding contacts in parallel with a pushbutton switch 71, and normally closed contacts 70c arranged to control a pilot light 72. A second contact bar 70d is arranged for closing alternatively a set of normally open contacts 70e in the stop circuit of the machine drive (not shown), and a set of normally closed contacts 70f in an anti-feedback circuit to be described herefollowing. Idle counter 67 has associated therewith similar elements in the form of a relay 73 having contact bars 73a and 73d which move respectively between contacts 73b and 73c, and between contacts 73e and 73f, similarly to the contact bars of relay 71; relay 73 having associated therewith also a pushbutton switch 74 and a pilot light 75. The connection to the start-stop circuit of the machine controlled by contacts 70e and 73e is through a lead 76.

As shown in Fig. 30, the arm of switch 68 closes a contact 68a which is electrically associated with switch 66a so that control is presently through counter 66. When the operator set up a predetermined number on counter 66 it automatically opened contacts 66b of switch 66a and automatically set arm 66c of the switch against a contact 66d in the holding circuit of relay 70. As the arm 66c is electrically connected to one side of the power supply, namely lead L1, when the operator presses pushbutton 71, the circuit to relay 70 is momentarily closed, thereby disposing the relay, as shown in Fig. 30 with the normally open contacts thereof now closed and the normally closed contacts thereof now opened. A counter deactivator arm 77 is locking out a counter finger 77a while allowing a counter finger 77b to move freely and record on counter 66 the books entering the machine.

Similarly, setting of a number on counter 67 closes the holding circuit for relay 73, and pushing of the button 74 for switch 67a sets the relay 73 in a similar manner.

The anti-feedback circuit referred to above includes the contacts 70f and 73f, a four-pole, double break, relay 78, a normally closed pushbutton switch 79, a signal light 80, and a switch 81 which is momentarily closed by the Geneva follower 69a each time the follower reverses position.

At the end of the present dealer's imprint run, switch 66a is reversed by the counter 66 reaching the predetermined count. This closes contact 66b to connect contact 68a of selector switch 68 with lead L1, and concurrently opens contact 66d to break the relay holding circuit and drop out relay 70. The deenergization of relay 70 lights pilot light 72 and closes contacts 70f in the anti-feedback circuit.

With energy now being provided to contact 68a of selector switch 68, current may flow through the selector switch, through a set of contacts 78a of the anti-feedback relay 78 which are presently closed by a contact bar 78b therein, and through a normally closed manual snap switch 82 to actuate momentarily a solenoid 83 for a four-tooth clutch dog 84. This effects reversal of the front imprinting rollers B1 and B2. To effect this reversal manually when desired, switch 82 is arranged to connect solenoid 83 directly to line L1.

The remaining operations performed by the closing of counter switch 66a require very precise timing. To this end, an overriding trigger switch 85 is closed once in every cycle of the machine by a cam 85a which is maintained in accurate timed relation with the machine drive shaft 62b. A first device controlled by switch 85 is a solenoid 86 arranged to set a pin 87a in a dealer's change wheel 87 forming a part of the dealer's change memory M. Also operated by the closing of trigger switch 85 is a solenoid 77c reversing the position of counter deactivator arm 77 to lock out operating finger 77b and release operating finger 77a. The pin 87a which is set by the action of solenoid 86 immediately engages the Geneva wheel 69 and moves the wheel to reverse the position of the Geneva follower 69a, thus reversing the double throw, selector switch 88 (which originally connected the counter deactivator solenoid 77c to switch 85) to now connect thereto opposite solenoid 77d. At the same time cam follower 69a reverses switch 68 to close the contact 68b; and this reversal of switches 68 and 88, resets the imprint change circuit Z-1 for control by counter 67 which has now become the operating counter.

At this point only the front imprinting units have been reversed and it is still necessary to reverse the back imprinting units to complete the reversal of the imprinting mechanism. As the back imprinting units are approximately two cycles away from the front imprinting units, means must be provided to effect the reversal after a two-cycle time delay. To this end a cam 89 is associated with the clutch dog 84 to operate a switch 90 approximately two cycles after the operation of solenoid 83, which switch is thus momentarily closed to connect a solenoid 91 to lead L1. The energization of solenoid 91 effects an advancement of a second, four-tooth clutch dog 92 to effect the reversal of the back imprinting rollers C1 and C2.

16 cycles after pin 87a is set, it engages a microswitch 93 to close a normally open contact 93b, and open a normally closed contact 93c. The closing of contact 93b effects an activation of a solenoid 94 which operates a pin-setting plunger 95 and a cancelling ring 96 in the 25-count memory device M. Again, to achieve accurate timing of the setting of a pin 97a in 25-count wheel 97, the circuit through microswitch 93 is connected in series with an overriding trigger switch 98 which is closed every cycle by a cam 98a similar to cam 85a.

25-count wheel 97 rotates once every 25 books and thus every time pin 97a passes switch 99, unless other circuit changes are introduced into the control arrangement, an associated solenoid 100 is energized to operate 25-count deflector 101 and kick the passing book outwardly to indicate the 25-count to the packer. At the time pin 97a is set, however, a second deflector solenoid 102 is energized through contact 93b, thereby operating the dealer's or imprint change deflector 103 to kick the passing book away from the packer, or inwardly of the machine, thereby to indicate the end of the previous imprint run.

The circuit for the book deflector solenoids 100 and 102 is such that if an imprinting run contains an even multiple of 25 books the solenoid 102 will be actuated but not the solenoid 100, so that the deflector will correctly indicate the end of the run. This is by reason of the fact that switch 99 is in series with the normally closed contacts 93c of microswitch 93, so that closing of switch 99 when microswitch contact 93c is open (at the time of an imprint change) does not energize solenoid 100. Instead, solenoid 102 is energized by the closing of contact 93b.

The anti-feedback portion of imprint change circuit Z-1, including relay 78, is to take care of the situation which would exist if a run under the control of one counter were to end before the operator had completed the changing of the imprinting plates on the idle rollers and the resetting of the idle counter. We have previously assumed a condition in which counter 66 had been in control, but ran out of its count to switch circuits for control by the originally idle counter 67. As long as counter 67 was properly set and operating in its control capacity, the anti-feedback circuit is broken at contacts 73f of relay 73. If, at the end of the run under control of counter 67, the then idle imprinting rollers and counter 66 were not ready, movement of switch 67a would close the anti-feedback circuit through contacts 73f to one side of switch 81. Under these conditions, the front imprinting rollers would reverse as usual; but before switches 68 and 88 could reverse by movement of the Geneva wheel 69, follower 69a would close switch 81 to activate the anti-feedback relay 78, to open contacts 78a thereby disconnecting clutch solenoid 83, and closing a normally open set of contacts 78c to light signal light 80. Operation of the machine can be resumed only upon setting the non-set counter and pressing the appropriate pushbutton to break the anti-feedback circuit at the relay controlled by the pushbutton. Further, in order to close the circuit to solenoid 83 it is necessary to open the normally closed pushbutton 79, to break the holding circuit for the relay 78 and permit the relay to return to the position of Fig. 30. At the same time the signal light 80 is extinguished to show that the unit is ready to return to service.

To further illustrate this operation of the machine, in the upper right corner of Fig. 30 a book b25 is shown deflected outwardly for signalling the 25-count. Adjacent deflector 103 is a book b-last which has just been deflected inwardly to mark the end of an imprinting run.

The portion of the control and memory devices described above is substantially similar to the control and memory devices of the Otho Kile disclosure, to which reference may be made for a more detailed disclosure of the elements just discussed. The circuits now to be described are not found in the Otho Kile disclosure, and thus a more complete and detailed description of the structure of the elements thereof will be made in conjunction with the description of the circuits as shown schematically on Figs. 30 and 31.

Reject circuit Z-3

Figs. 23 and 24, in conjunction with the portion Z-3 of Fig. 30, show the controls for operating the reject device I, which prevents an improperly imprinted book from passing through the labeller to the delivery table.

Referring first to Fig. 30, a time delay relay 104 which is normally energized during machine operation through a lead 104a from the run circuit (not shown) of the machine drive control equipment is provided with a set of normally open contacts 104b. When the machine is stopped the current from line 104a is discontinued to the relay, and a short time delay occurs before the normally open contacts 104b are closed; this time delay being such that contacts 104b will close only if the shutdown is long enough to dry the ink on the imprinting rollers. The circuit from contacts 104b is through a set of normally closed contacts 105a of a relay 105 to energize a third relay 106 from lead L1 through the contacts 104b. When relay 106 is energized, normally open contacts 106a thereon are closed to energize a pin-setting solenoid 107 (Fig. 23) of reject memory O and set a pin 58a on the reject memory chain 58.

When the machine is once again started, relay 104 is energized so that the feed to solenoid 106 is immediately broken and, thus, to maintain the relay 106 energized a holding circuit is provided through a set of normally open contacts 106b thereon, and a normally closed switch 108 from line L1. When the machine is restarted, however, the memory chain 58 is cycle advanced (moved in one to one relationship with the machine) so that after the machine has advanced slightly less than one cycle the set pin 58a engages a switch 108 to open the switch momentarily and deenergize the relay 106, thereby reopening the contacts 106a to prevent the solenoid 107 from setting a second pin. The holding circuit energizes solenoid 107 long enough to assure that pin 58a is set, as there is no guarantee that the chain will be stopped in exact alignment with the solenoid 107 at the time the contacts 104b of the time delay relay 104 are set.

As memory chain 58 continues to cycle advance it strikes a counter holdout cam 109 and a reject rod release cam 110. Each of these cams extends along the memory chain 58 a distance comparable to two cycles movement thereof, and the same are spaced apart approximately one and one-half cycles, or a distance comparable to the cycle spacing between the front and back imprinting rollers. Cam 109 is arranged to operate a normally open switch 111 which controls a solenoid 77e associated with a counter lockout arm 77f to prevent operation of the operating counter for two cycles. The feed to solenoid 77e through switch 111 is from line L1 through a set of normally closed contacts 105b of relay 105. Concurrently with the operation of switch 111, cam 109 moves the locking bar 56 to release the lever 55d and allow flippers 55a to redirect two of the books br–1 and br–2 through the reject device I. The position of cam 109 along the memory chain 58 is correlated with the cycle spacing of the back imprinting rollers C–1 and C–2 so that it is the books that were in the back imprinting unit C which are thus removed from the normal book stream. Several cycles later, when the books which were in the front imprinting unit B reach the flippers 55a, pin 58a has moved to a position where it abuts cam 110, which is also associated with locking bar 56 to operate flippers 55a and remove two additional books from the normal stream. As only two of the four removed books (one of the two that were in the back imprinting unit and one of the two that were in the front imprinting unit at the time of stopping the machine) normally are found to be defective, the two satisfactory books may be replaced in the supply delivered to the packers. Since cam 110 is not associated with switch 111, only two counting operations are prevented by the operation of the solenoid 77e, thus correctly indicating the actual removal of only two books from the stream.

Where the back and front portions of the books are not being concurrently imprinted, the cams 109 and 110 may be shortened, as by substitution, to extend longitudinally of the chain one cycle length only.

All defective books are usually removed from the stream in the manner described above; but when the defect occurs at the same time that a dealer's, or imprint change is being made it is more desirable to permit the dealer's change to go through without the overriding action of the reject device I. To accomplish this, a normally open switch 112 is operated by cam follower 69a at the time of an imprint change to energize relay 105, thereby opening contacts 105a and precluding operation of solenoid 107. Further, when relay 105 is pulled in, a set of normally open contacts 105c is closed to connect a pin cancelling solenoid 113 to line L1 and cancel any pin set on memory chain 58 prior to the operation of the Geneva wheel, before the set pin can act on cams 109 or 110. At the same time, contacts 105b are opened positively to prevent operation of solenoid 77e. To hold relay 105 in until the imprint change has been completed, a holding circuit is established through normally open contacts 105d energizing the relay 105 from line L1 through a switch 114 associated with dealer's change wheel 87 to be operated by pin 87a thereon six cycles after the imprint change is effected. The actuation of switch 114 thus breaks the holding circuit to relay 105, dropping out the relay and reestablishing circuit Z-3 for future control by time delay relay 104.

As the functioning of the set pin 58a is completed when it has passed each of the cams 109 and 110, it is cancelled by means of a cancelling cam 115. Each time the imprinting and labelling machine is stopped for a period longer than the predetermined time for which relay 104 is set, a pin is normally set in the memory chain 58. Thus, should the machine be inched or jogged (intermittently or discontinuously operated a few cycles at a time), and the time delay between the jogging operations is greater than the predetermined time, the defective books caused by this delay will automatically be removed from the stream by means of reject device I and its associated memory O.

Label signal pickup circuit Z-4

For convenience in describing the coordination between the books and the labels, certain terms will be used, as follows:

(1) The term "label set" includes either a predetermined series of sheets to which a particular label series is applied, or a predetermined series of sheets to which no label is applied.

(2) The term "label series" includes a predetermined strip segment of labels, which are alike in at least one respect. Thus, a label series may be a label strip segment in which all the labels are addressed merely, for example, to "Boxholder, Route 1, Labelville, Ill."; or it may be a label strip segment in which the labels bear different street addresses, but are all directed to one town or one postal zone.

(3) The term "control label" refers to the last label of a label series, which is used to convey control information to the circuit Z-4.

As discussed above, a second means is employed at certain times in the imprinter-labeller machine for providing control information in effecting automatic operation thereof. This second means is generally designated the photo-electric signal means G, and the circuit associated with the pickup of the information is designated the label pickup circuit Z-4 (Fig. 31).

Referring now more particularly to Fig. 31, the label signalling means may be seen to include a pair of photoelectric scanning heads 116 and 117 which are positioned adjacent the pin wheel 40 (Fig. 3) to scan a label and to provide an electrical output representing the absence or presence of a suitable mark on a control label. In the illustrative embodiment of the invention, as seen in Fig. 28, two signal marks are employed on the control label, namely, a mark 118 disposed along one edge of the label strip 42a and another mark 119 disposed along the opposite edge of the strip. Through the use of such marks it is obvious that three signal conditions may be obtained, namely, a first condition wherein mark 118 may be scanned by head 116, a second condition wherein mark 119 may be scanned by head 117, and a third condition wherein marks 118 and 119 may be simultaneously scanned by heads 116 and 117, respectively.

The location of the scanning heads 116 and 117 is thirteen labels from the labelling point, just as the labelling point is thirteen book spaces from the counter associated with the front imprinting rollers; so that the "control label" goes onto the last book of a "label set."

A comprehension of the label and imprint controls requires that certain conditions be understood as basic to the unit.

(1) The labeller controls the imprint changes whenever the labeller is in operation at the end of an imprint run. Otherwise the preselect counters control.

(2) Every time there is an imprint change, the machine automatically starts the labeller if it is stopped, or causes it to continue running. Whenever an imprint run is to start without labelling, the manual information supply circuit Z-5 must be used to prevent the labeller from operating with the beginning of the new imprint run.

(3) There are two situations where something must be done by the label signal circuit Z-4 without starting a new imprint run.

The various possible changes in the machine are produced by the preselect counters when the labeller is not operating, or by the marking on the control label when the labeller is operating. One mark is used on the control label when there is to be no imprint change, while two marks appear on the control label when there is to be an imprint change.

In the operation of the unit the following conditions occur, and are met in the manner stated with each condition.

(1) An imprint run ends without labels, and the next run is to start with labels. The preselect counters are in control of the machine, and the operation of the controls previously described starts the labelling, as well as deflecting a book to indicate the end of a label set and resetting the 25-count device.

(2) An imprint run ends without labels, and the next run is to start without labels. The manual circuit Z-5 is operated when the imprint change takes place to prevent the labelling mechanism from starting.

(3) An imprint run ends with labels, and the next run is to start with labels. The control label has both marks 118 and 119, so as to actuate both scanners 116 and 117. The labeller is in control; and in order to eliminate interference between the label control and the counters, the machine attendant has set the operating counter to a number higher than the total number of books in the imprint run because his worksheet shows that the run is 100% label. The imprint change occurs, the labeller is set to continue running, a book is deflected to show the end of a label set, and the 25-count device is reset.

(4) An imprint run ends with labels, but the next imprint run is to start without labels. Again there are two marks on the control label, but the continuing operation of the labeller is prevented by the use of manual circuit Z-5.

The foregoing are all the situations which may arise in conjunction with the end of an imprint run.

Where there is to be no imprint change, the following two conditions may arise:

(1) All the labels for a particular imprint run have been applied but there are to be additional unlabelled books. Under these circumstances, the control label has only a mark 118, to actuate the photo-electric scanner 116. The controls in this case deflect the last book of the label set to give the proper information to the packers, reset the 25-count device, and cut out the labelling mechanism so as to leave the counters in control.

(2) There may be a change of postoffice zone or city, marking the end of one label set and the beginning of another label set. In this case the control label has only a mark 119 to actuate the photo-electric scanner 117. A book is deflected to indicate the end of the label set, and the 25-count device is reset.

It is obvious that if desired the control label may be provided with additional marks, for scanning by additional scanning devices, where more signal conditions are required.

Associated with scanning head 116 is a power amplifier such as thyratron means 116a for operating a control relay 116b through a normally closed reset switch 116c. Energizing relay 116b closes a normally open contact 116d which connects a pin setting solenoid 120 on labeller memory device L (see Figs. 14 to 16) to line L1 through a trigger switch 121 controlled by a cam 121a synchronized to the operation of the machine. The operation of relay 116b concurrently closes a normally opened contact 116e which is associated with the Z-6 circuit to provide electric power thereto from switch 121.

Scanning head 117 is similarly associated with a thyratron means 117a, a control relay 117b, and a reset switch 117c. A normally open contact 117d is provided in relay 117b for operation of solenoid 120 through switch 121, and a normally open contact 117e is provided therein for association with circuit Z-6, with power being provided from switch 121.

Thus either of scanning heads 116 or 117 may, through its respective associated elements, effect the energization of solenoid 120 to set a pin in labeller memory L and convert the photo-electric signal to a mechanical signal in the labeller memory. Concurrently the photo-electric signal is converted to an electric signal fed to the setup circuit Z-6.

*Manual information supply circuit Z-5*

As discussed above, the machine operator may feed additional information to the control devices of the machine by manual operation of circuit Z-5.

As seen in Fig. 31, this circuit includes a "label stop" pushbutton 122 and a "label hold" pushbutton 123. "Stop" button 122 is used where an imprint run ends with the labeller in control, and the next run is to be without labels. "Hold" button 123 is used where an imprint run ends with the preselect counters in control, and the next run is to be without labels.

Associated with pushbutton units 122 and 123 is a relay 124 which is energized from line L1 through normally open contacts 122a of pushbutton 122 or normally open contacts 123a of pushbutton 123, and through a series connected, normally closed switch 125. Associated with pushbutton 122 is a second relay 126 which is energized by means of a second set of normally open contacts 122b of pushbutton 122, in series connected relationship with switch 125. For indicating the condition of the "label stop" circuit and relay 126, a signal light 127 is concurrently controlled by contacts 122b.

Associated with "label hold" pushbutton 123 is a third relay 128 which is controlled by a set of normally open contacts 123b on pushbutton 123 connected in series with switch 125. A signal light 129 is concurrently controlled by pushbutton contacts 123b to indicate the condition of relay 128. Relay 126 is provided with a set of normally open contacts 126a and relay 128 is provided with a set of normally open contacts 128a, and each set of contacts is connected to line L1 through a normally closed switch 130 associated with dealer's change wheel 87, to provide a holding circuit for maintaining the relays energized. A parallel circuit is provided for maintaining the relays energized, including a set of normally open contacts 124a of relay 124 through which contacts 126a and 128a are connected to line L1 when relay 124 is energized. Switch 130 is maintained closed until pin 87a of the dealer's change wheel strikes it and momentarily opens it to drop out the relay and reset the pushbutton circuits. Also associated with relay 126 is a second set of normally open contacts 126b and a third set of normally open contacts 126c; and associated with relay 128 is a second set of normally open contacts 128b.

Use of pushbutton 123 is seldom necessary, because the "no label" to "no label" type of change usually may be eliminated by proper arrangement of the successive imprint runs.

*Set up or potentiating circuit Z-6*

The signals delivered from the information supplying circuits Z-4 and Z-5 serve to actuate the labeller control circuits Z-7 and imprint change control circuit Z-10. However, this cannot be done directly from circuits Z-4 and Z-5 and intermediary means are provided to correlate these circuits. Serving as a key element in this correlating function is the circuit Z-6 which receives the information from circuits Z-4 and Z-5 and "sets up" the information by means of suitable relays so that it is in proper form for controlling the subsequent circuits at the proper time.

Circuit Z-6, as seen in Fig. 31, includes a first relay 131 having a set of normally closed contacts 131a connected in series with contacts 116e of the feed from control relay 116b for energizing the relay 131. A signal light 132 is connected in parallel with the relay 131 to indicate the operative condition of the relay. A second relay 133 is included in circuit Z-6 and is provided with a set of normally closed contacts 133a through which the relay is energized from contacts 117e of control relay 117b. A signal light 134 is connected across relay 133 to indicate the operative condition thereof. Relay 131 further includes a set of normally open contacts 131b which serve as holding contacts when the relay is energized, by their connection to line L1 through a series connected, normally closed switch 135 associated with the dealer's change memory wheel 87. Switch 135 is positioned so that when pin 87a on the dealer's change wheel reaches the 14th position from the set point it operates the switch to open the circuit and drop out relay 131. Relay 133 is similarly provided with a set of normally open contacts 133b which are connected in series with the switch 135 for a similar control of relay 133. Also associated with relay 131 is a first set of normally open contacts 131c and a second set of normally open contacts 131d. Also associated with relay 133 is a second set of normally closed contacts 133c, a third set of normally closed contacts 133d and a second set of normally open contacts 133e.

A third switch 136 (Fig. 14) is provided in circuit Z-6, in operative relationship with labeller memory L, the function of which is to provide power from line L1 through serially connected contacts 131c and 133d, to the labeller switch circuit Z-7 for controlling the operation of the labelling mechanism E.

For a more complete understanding of the structure and operation of labeller memory L, more particular reference will now be had to Figs. 14 through 16. Labeller memory L is book advanced by means of a chain 137 which is driven off a sprocket 44r on constant feed drive shaft 44 (Fig. 11) to rotate a shaft 137a through a sprocket 137b fixedly secured thereto. Associated with a speed reducer 137e driven by shaft 137a is a memory chain drive sprocket 137c which provides a book advanced drive for a memory chain 138. Chain 138 rides over an idle sprocket 137d which is disposed generally vertically above the driver sprocket 137b.

Chain 138 is similar in structure to the other memory chains incorporated in the machine; and as seen in Figs. 25 through 27, each chain comprises a series of pin carrying links 139 having transverse bores 139a, and connecting links 140, in continuous alternate arrangement. Snugly slidably, mounted in each bore, and projecting from both ends thereof, is a pin 141 the midportion 141a of which is reduced in diameter to provide a pin and slot connection with an inwardly projecting pin 139b on link 139. At one end, the pin has an enlarged head 141b providing a camming or actuating portion. Thus, it may be seen that the pin may be moved longitudinally of itself to vary the position of the head 141b with reference to the link 139, so that the head may either contact or miss associated switch elements as the chain travels.

Returning now to Figs. 14 to 16, solenoid means 120 of circuit Z-4 is seen to include a pin-setting lever 120a adjacent the path of chain 138 at sprocket 137d. As there are approximately thirteen books between the counter mechanism F and the labelling mechanism E, as seen in Fig. 5, and the control label of an imprint run is thirteen labels from the labelling point when it is viewed by the scanning heads, the solenoid 120 sets a pin on memory chain 138 approximately thirteen positions away from the means which the pin is to control at the time of label transfer. The chain 138 is book advanced, so that each time a book is delivered to the labelling mechanism to have a label affixed thereto, the chain moves one position forward.

Three switches are associated with the memory chain 138 for actuation by the set pin. A first switch 142 is arranged to be actuated by the set pin after the chain has moved twelve positions. The second switch 136, previously mentioned, is positioned just slightly beyond switch 142 to be actuated after the chain has moved just slightly more than twelve positions. A third switch 143 is positioned to be actuated after the chain has moved beyond thirteen positions. After the set pin has actuated each of these switches, it is no longer needed for information purposes, and a cancelling cam 144 is positioned slightly beyond switch 144 to move the pin longitudinally inwardly to the "reset" position.

Returning now to Fig. 31, circuit Z-6 may be seen to further include a switch 145 which is associated with the dealer's imprint change wheel 87 whereby pin 87a opens the switch between the eleventh and twelfth positions of the wheel, automatically starting the labelling mechanism on an imprint change by opening the circuit previously established from line L1 to circuit Z-7 through contacts 133c of the above described relay 133, and a set of normally open contacts 146a associated with a relay 146 forming a part of circuit Z-11 which will be described more fully.

*Labeller switch circuit Z-7*

As seen in Fig. 31, circuit Z-7 includes a relay 147 which is energized by the closing of switch 136 associated with the labeller memory L through contacts 131c of relay 131 and contacts 133d of relay 133. Alternatively relay 147 may be energized from contacts 131c through contacts 126b of relay 126 of the manual information supply circuit Z-5. A holding circuit for relay 147 may be established through normally open contacts 147a thereof through contacts 126c of relay 126 or contacts 128b of relay 128, of circuit Z-5, when either of these relays are energized. A first set of normally closed contacts 147b is associated with relay 147 to control the supply of electric power from line L1 to circuit Z-8 for purposes to be later described in connection with that circuit. A second set of normally closed contacts 147c is associated with relay 147 for controlling current delivered to a solenoid 148, so that whenever solenoid 148 is energized, mechanism 44b is moved outwardly and allows the driving of the labelling mechanism from sprocket 43, as seen in Fig. 11, through clutch arm 44a.

*Missing book cutout circuit Z–8*

To prevent operation of the labelling mechanism E whenever there is no book in position for receiving a label, circuit Z–8 is associated with circuit Z–7 to control the supply of current through contacts 147c to solenoid 148 of the last mentioned circuit. This control is through a set of normally closed contacts 149a of a relay 149. Energization of relay 149 and, therefore, the opening of contacts 149a to deenergize solenoid 148 and discontinue operation of the labelling mechanism, is effected through a pair of book sensing switches 150 and 151. As seen in Fig. 3 switch 150 is positioned to sense the absence or presence of a book between belts 30 and 31 as they pass around a drum 37a at a point upstream from the label applying means associated with drum 37. To synchronize the operation of switch 150 with the book spacing on the belts, a switch 152 is arranged in series with switch 150 for actuation by a cam 152a to be closed at the midportion of the space normally filled by a book. The series circuit of switches 150 and 152 is connected in turn in series with normally closed contacts 147b of relay 147 in circuit Z–7.

Once relay 149 is energized, a holding circuit is established across a set of normally open contacts 149b associated therewith through a parallel circuit comprising book sensing switch 151 and a normally closed switch 153 operated by a cam 153a, which parallel circuit is arranged in series with contacts 147b. The dwell time of cam 152a is longer than dwell time of cam 153a to assure constant energization of relay 149 where a plurality of books are missing.

*Signal correcting circuit Z–9*

Figure 22:
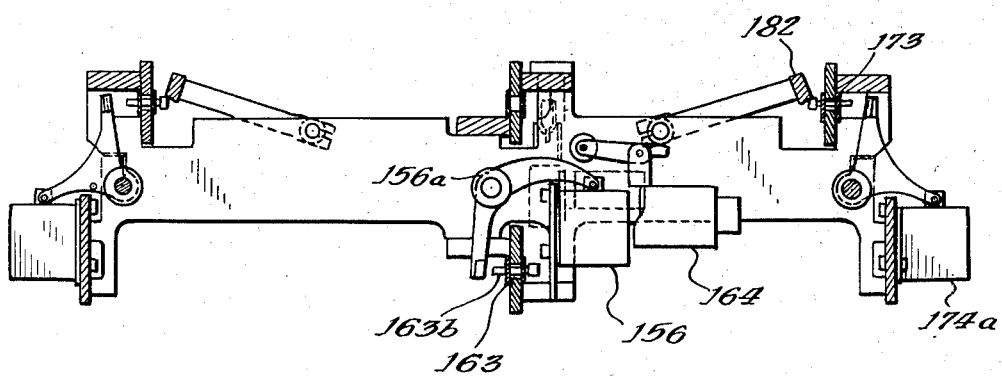
Fig. 22 is a vertical section taken substantially as indicated along the line 22—22 of Fig. 19.

As indicated above, a signal correcting circuit is needed to account for the number of books which are missing in the stream between the counter mechanism F and the labelling mechanism E at the time the label signal is scanned, to assure the imprinting of a sufficient number of additional books to make up for those missing before the change signaled by the control label is actually accomplished and the imprint units reversed. Circuit Z–9 includes a counter cam 154 which is actuated in synchronism with the counters 66 or 67 to rock an arm 154a once every time a book passes the counter lockout rider finger 25. A normally open switch 155 is associated with the arm 154a to be closed momentarily every time the arm 154a is rocked. The feed to solenoid 156 (Figs. 19 and 22) is from line L1 through a normally open switch 157 which is closed only at an accurately predetermined time during each cycle by means of a trigger cam 157a. Cam 154 is rotated once every cycle of the machine to close switch 155 normally when arm 154a is against the lower part of cam 154 and switch 157 is open. To prevent return of arm 154a and maintain switch 155 closed at the same time switch 157 is closed, a lockout arm 158 is associated with counter arm 154a to engage one end of the arm and prevent it from following the cam whenever a book is missing from the stream. As seen in Fig. 1, when arm 154a rocks it also operates the proper counter 66 or 67 by means of an integral operating arm 154b.

As seen in Fig. 1, cam 154 is fixedly mounted on a shaft 159 which is cycle advanced or driven in direct relationship with shaft 63e. Lockout arm 158 is fixed secured to a shaft 160 to which counter lockout rider finger 25 is fixed.

The cycle advanced memory J is driven by a sprocket 161 fixed on shaft 159 which acts through a chain 161a to rotate a sprocket 162 which is associated with a speed reducer 162a driving a sprocket 163a on a shaft 163c. Referring now to Figs. 1, 19 through 22, and 31, the the structure and functioning of reference memory J may be seen. Memory J includes a memory chain 163 of the type shown in Figs. 25 to 27. This chain is driven in time with the machine drive by means of the driver sprocket 163a. With reference to Figs. 19 through 22 it should be noted at this point that two sets of memory devices J and K are shown therein, one set for the right hand stream of books, and one set for the left hand stream of books. As each set is identical, and as this description is limited to the structure associated with a single stream of books, the following description is limited to the structure of the memory devices J and K for use with the right hand stream of books only. Thus, while chain 163 forms a complete loop, only a group of switches associated with the lower run of the book comprises the memory mechanism associated with the right hand stream of books, while separate switches associated with the upper run of the chain function with the left hand stream.

Solenoid 156 acts through its arm 156a to "set" a pin 163b on chain 163 and concurrently close a normally open switch 164 to energize a solenoid 165 for advancing, or stepping upwardly, a single pole, fourteen throw switch 166, illustratively shown as a rotary stepping switch having eighteen positions. Switches of this type are well known in the art and need no further description here, other than to point out that the switch operates to move up one step every time the solenoid is operated so that it moves by successive operations of the solenoid from contact 200, to contact 201, to contact 202, etc., up to contact 213 where it remains notwithstanding additional operations of the solenoid.

After pin 163b has advanced slightly over 13 cycle positions from the pin setting position it strikes a switch 167 to energize momentarily a subtracting solenoid 168 associated with rotary switch 166 for stepping the switch downwardly, or in the reverse direction from the stepping effected by the adding solenoid 165.

In normal machine operation, switch 166 may be set on the zero contact by manipulation of a push button 169, for energizing a reset mechanism (not shown) provided in the switch for this purpose, at any time during an imprint run when no books are missing from the stream between the counter mechanism and the labeller. As switch 155 is closed during the portion of the cycle when switch 157 is closed only when a book is missing from the stream (by lockout arm 158 holding lever 154a against the switch 155), a pin is set in chain 163 only when there is a book missing from the stream. Switch 164 is concurrently operated when there is a book missing to step switch 166 one step upwardly, such as from contact 200 to contact 201. The setting of the stepping switch 166 corrects the signal fed to circuit Z–10 from circuit Z–6 to delay the firing of the imprint change mechanism until one additional book has been imprinted to make up for the one that is missing between the counter and the labelling means. Thirteen cycles later pin 163b has moved along to a point out of the reference area and cancels the setting of switch 166 by actuation of switch 167 to engage solenoid 168 and move switch 166 back to contact 200. Slightly beyond switch 167, pin 163b is "reset" by means of a camming device 170.

*Signal storage and firing circuit Z–10*

Still referring to Figs. 19 through 22 and 31, circuit Z–10 is seen to include the storage memory K and associated relay and switch devices. As seen in Figs. 30 and 31, the means for actually firing the imprint change comprises a switch 171 (Figs. 19 and 20) which is closed by action of the storage memory at the proper time to provide energy through contacts 78a to the imprint change solenoid 83. For properly setting the storage memory K, a relay 172 is provided having a set of normally closed contacts 172a connected in series with contacts 133e and 131d of circuit Z–6, and the stepping relay 166 of circuit Z–9.

Storage memory K comprises a memory chain 173 carried on sprockets 173a and 173b, and having associated therewith fourteen pin setting solenoids designated 174a to 174n respectively. The solenoids are disposed along the chain one pin spacing apart, with solenoid 174a positioned immediately adjacent a cam 175 arranged to be operated by the set pin to effect the closing of switch 171. The last solenoid, solenoid 174n, is thirteen pin spaces away from cam 175, and as chain 173 is book advanced, a pin set by solenoid 174n is not in a position to actuate cam 175 until thirteen additional books have been delivered to the imprinter. As the intermediate solenoids are positioned at lesser distances from cam 175, the pins set thereby will respectively operate cam 175 after correspondingly smaller members of additional books have been delivered to the imprinter. The specific solenoid which is energized to set the proper pin for controlling cam 175 is selected by the stepping switch 166 which, as discussed above, properly reflects the number of books missing in the stream between the counter and labelling mechanism at the time the control label is scanned. This selection of solenoids is effected by connecting solenoid 174a to contact 200, solenoid 174b to contact 201, etc., contact 213 being connected to solenoid 174n.

The means for driving chain 173 in a book advanced manner is shown in Fig. 1. A book sampling arm 176 is disposed beyond counter finger 25 to bear against a control lever 177 and prevent it from swinging about a pivot 177a, whenever a book is missing from the stream under arm 176. Lever 177 is normally pivoted about pivot 177a once each cycle by means of the cam 154 on shaft 159 and a cam follower 178a carried at one end of the lever 177. A spring means 178b may be employed to bias lever 177 and cause follower 178a to properly bear against cam 154. An operating arm 179 is secured in fixed relationship to lever 177 to swing about pivot 177a, whereby a pusher arm 179a carried at the lower end of arm 179 is reciprocated to advance a ratchet wheel 180 which is rotatably mounted on shaft 163c and pinned to sprocket 173b of memory chain 173 to advance the chain one cycle for each actuation of the ratchet.

Extending over substantially the entire length of the reference area (from solenoids 174b to 174n), for engagement with the pin set by any of solenoids 174b to 174n is a cam bar 182 arranged to operate a first, normally open switch 183 and a second, normally open switch 184. Bar 182 terminates just short of solenoid 174a and, thus, a pin set by any of solenoids 174b to 174n maintains switches 183 and 184 closed until the pin reaches the firing position, wherein it contacts cam 175. Cam 175 is provided with an extension 175a bearing against cam bar 182, arranged to raise bar 182 whenever cam 175 is raised so that switches 183 and 184 are operated also when solenoid 174a is used to set the pin on chain 173. Switch 183 is connected in series with contacts 133e of relay 133 of circuit Z-6 to energize relay 172 and open contacts 172a leading to the stepping switch 166. This assures that only one pin will be set on chain 173 notwithstanding any additional signals coming from circuit Z-6. Relay 172 is further provided with a normally open contact 172b connected in parallel with switch 183 to serve as the holding contact for the relay to maintain the relay energized notwithstanding the subsequent opening of switch 183.

Switch 184 connects a solenoid 185 to line L1 for operating a reject hold arm 186 to bear against lever 55d and prevent operation of flippers 55a. Thus, the number of missing books determined by the mechanism associated with circuits Z-9 will not be changed by withdrawal of defective books, once the imprint change circuits are established as described above to effect the imprint transfer.

*Label controlled book deflecting circuit Z-11*

At the end of a "label set" as defined, it is desired to indicate the last book in the label set to the packers, and book deflectors H are employed for this purpose. As this book, at the time of labelling, is approximately four books away from the deflectors, it is necessary to delay the operation of the deflectors approximately four cycles from the time of label application. Circuit Z-11 effects this time delay.

Referring now to Fig. 31, switch 142 is seen to be closed by the set pin on labeller memory chain 138 (Figs. 14 to 16) after twelve books have been delivered to the labellers. This energizes relay 146. A pin setting solenoid 187 is energized by the closing of a second set of normally open contacts 146b provided on relay 146, through a set of normally closed contacts 188a of a relay 188. Solenoid 187 sets a pin in the dealer's change wheel 87 at the twelfth position of the wheel, so that the wheel must be advanced four additional cycles before the pin contacts operating lever 93a of switch 93 to effect the operation of the deflector solenoid 102. As the dealer's change wheel is cycle advanced, both the set pin and the book bearing the last applied label will have advanced correspondingly, assuring that the proper book will be deflected. A switch 189 is closed concurrently with the setting of the pin by solenoid 187, to energize relays 188 and open its contacts 188a.

Relay 146 is provided with a third set of normally open contacts 146c, and relay 188 is provided with a set of normally open contacts 188b which are connected in series from line L1 to provide a holding circuit for relay 188 to maintain contacts 188a open and prevent the setting of additional pins by the solenoid 187.

Switch 143 is arranged to be opened by the set pin in chain 138 shortly after switches 142 and 136 have been actuated thereby. Switch 143 is normally closed and is connected in series with a fourth set of normally open contacts 146d in relay 146 to provide a holding circuit for that relay. Thus, after circuit Z-11 has accomplished its purpose it is automatically reconditioned for a subsequent operation.

TYPICAL OPERATION OF THE MACHINE

While the specific functioning of the machine under each of the above indicated counter and label controlled change conditions is obvious to one skilled in the art from a study of the disclosure set forth above, one typical such operation is described herefollowing.

For illustrative purposes, it will be assumed that the end of the present imprint run is to occur while labels are being affixed and that the next imprint run will be one not requiring labels. As the labels are being applied at the end of the present run, the labeller controls the dealer's, or imprint change, and therefore a suitable signal, in this case both "stop" mark 118 and "labeller change" mark 119, are provided on the control label of the present label series. To prevent interference with the label control, the machine attendant sets the operating counter 66 at some number higher than the total number of books to be imprinted in the present run, so that, while it will count the number of books, it will not operate its switch 56a to effect the imprint change, but rather will allow signal means G to institute the change. As the next run is not to have labels applied, the idle counter 67 will be set for the exact number of books to be imprinted during that run.

As previously mentioned, this machine operation requires that the attendant manually depress pushbutton 122 in circuit Z-5, to prevent operation of the labeller on the next run, which illuminates the related signal light 127. At the same time, relay 126 is energized and held in, through the circuit established through switch 130 and the normally open contacts 126a of relay 126. Contacts 126b close to provide a parallel circuit around contacts 133d of relay 133 in circuit Z-6. Additionally at this time, relay 124 is energized through contacts 122a of the pushbutton.

When the control label bearing the marks 118 and 119 reaches the scanning heads 116 and 117, the marks are sensed by the scanning heads and, through their respective Thyratron means 116a and 117a, solenoids 116b and 117b are energized. At the proper time in the same cycle, switch 121 sends an impulse through now closed contacts 116e and 117e to energize relays 131 and 133, respectively. These relays then hold themselves in through contacts 131b and 133b, respectively from switch 135. The energizing of relays 116b and 117b further effects the closing of their normally open contacts 116d and 117d respectively to energize solenoid 120 and set a pin in the label memory chain 138. As indicated above, chain 138 is book advanced and the pin set by solenoid 120 is thirteen labels away from the point of label application. Circuit Z–9 is functioning during this time so that stepping switch 166 correctly represents the number of books missing between the counters and the label position. The circuit to switch 166 is completed to line L1 at the time relays 131 and 133 are energized, and one of the solenoids 174a to 174n which is connected to the contact at which stepping switch 166 is set is thus energized to set a pin in storage memory chain 173. The setting of the pin on chain 173 immediately raises cam 182 to close switch 183 and energize relay 172. This opens contacts 172a to open the circuit to stepping switch 166, relay 172 being held in by its holding circuit through contacts 172b. As this discontinues the supply of current through switch 166 to the pin setting solenoids, only one pin is set in chain 173, cam 182 being raised continuously until the set pin reaches cam 175. Switch 184 is also closed by the raising of cam 182, and solenoid 185 is energized preventing operation of the reject circuit Z–3 at this time.

If no books are missing, solenoid 174a is energized and cam 182 is raised by extension 175a of cam 175.

When the pin set on chain 173 strikes cam 175 it closes switch 171. Switch 171 remains closed as the set pin travels over the length of cam 175, the time of such travel being sufficient to assure that all elements of circuits Z–1 and Z–2 are properly operated. Once the set pin passes beyond cam 175 both cams 175 and 182 are restored to their normal position. Circuit Z–10 is available for a subsequent similar operation after relays 131 and 133 are deenergized to drop out relay 172.

One of the things accomplished in circuit Z–1 by the impulse from switch 171 is the energization of solenoid 86 to set a pin 87a in the dealer's change wheel 87. The pin on label memory chain 138 which was previously set by solenoid 120 now advances to the twelfth position where it closes switch 142 energizing solenoid 187 to set a pin at the twelfth position of the dealer's change wheel 87. However, the pin had previously been set twelve books earlier by the signal from switch 171 and only a "resetting" of the set pin occurs. Immediately thereafter the set pin on chain 138 closes switch 136 to energize relay 147 through contacts 126b of relay 126. This immediately deenergizes solenoid 148 to stop the labelling mechanism, relay 147 being held in by the closing of its holding contacts 147a in series with the now closed contacts 126c of relay 126. At this point, relays 126, 131, 133, 146, 147, and 188 are energized.

When the pin set on dealer's change wheel 87 reaches the fourteenth position, it opens switch 135 thereby dropping out relays 131 and 133. When this pin reaches the fifteenth position, it opens switch 130 thereby opening the holding circuit for relay 126 and dropping it out. However, relay 147 remains energized through switch 145, closed contacts 133c of relay 133, and contacts 146a of relay 146. As the labelling mechanism is stopped, chain 138 is stopped and relays 146, 188 and 147 remain energized. When the labelling is next started and relay 147 is deenergized the chain 138 is again advanced and the set pin in chain 138 moves beyond the thirteenth position to open switch 143, releasing relay 146 which, in turn, releases relay 148 to reestablish circuit Z–11 for a succeeding operation.

Thus, the imprint transfer has been accomplished, and relay 147 is maintained energized to hold open its contacts 147c and prevent operation of the labelling mechanism. The machine is printing on the new imprint run which is being controlled by the previously idle counter 67, and no labels are being applied to the imprinted books passing through the labeller. When the number of books set on counter 67 has been imprinted, that counter will effect the imprint transfer as described earlier, and as set forth more fully in the Otho Kile disclosure.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. A machine for imprinting previously printed sheets and preparing them for distribution, comprising: an imprinting mechanism having a plurality of impression members which are provided with different, removable imprinting means, one of said members performing an imprinting function at any given time while others are idle so that said members may function alternatively to continuously imprint previously printed sheets seriatim to provide successive predetermined groups of sheets with different imprints; labelling means for applying labels seriatim to the imprinted sheets in sets which are correlated with the aforesaid groups of sheets; imprinting transfer means for effecting an automatic transfer of the imprinting function from an imprinting impression member to an idle impression member when the last sheet of a predetermined group has been imprinted; and control means for correlating the functioning of the labelling means with the functioning of the imprinting mechanism.

2. A machine for imprinting previously printed sheets and preparing them for distribution, comprising: an imprinting mechanism having a plurality of impression members which are provided with different, removable imprinting means, one of said members performing an imprinting function at any given time while others are idle so that said members may function alternatively to continuously imprint previously printed sheets seriatim to provide successive predetermined groups of sheets with different imprints; labelling means for applying labels seriatim to the imprinted sheets in sets which are correlated with the aforesaid groups of sheets; imprinting transfer means for effecting an automatic transfer of the imprinting function from an imprinting impression member to an idle impression member when the last sheet of a predeterined group has been imprinted; and control means responsive to a signal associated with the labelling means for correlating the functioning of the labelling means with the functioning of the imprinting mechanism.

3. A machine for imprinting previously printed sheets and preparing them for distribution, comprising: an imprinting mechanism having a plurality of impression members which are provided with different, removable imprinting means one of said members performing an imprinting function at any given time while others are idle so that said members, may function alternatively to continuously imprint previously printed sheets seriatim to provide successive predetermined groups of sheets with different imprints; labelling means for applying labels seriatim to the imprinted sheets in sets which are correlated with the aforesaid groups of sheets, said labelling means including a labelling member positioned a predetermined number of sheets after the imprinting mechanism; and control means arranged to correlate the functioning of the labelling means with the functioning of the imprinting mechanism to effect an automatic transfer of the imprinting function from an imprinting impression member to an idle impression member at the proper time to maintain a corresponding relationship between the number of sheets imprinted and the number of labels to be applied.

4. A machine for imprinting previously printed sheets and preparing them for distribution, comprising: an imprinting mechanism having a plurality of impression members which are provided with different, removable imprinting means, one of said members performing an imprinting function at any given time while others are idle so that said members may function alternatively to continuously imprint previously printed sheets seriatim to provide successive predetermined groups of sheets with different imprints; labelling means for applying labels seriatim to the imprinted sheets in sets which are correlated with the aforesaid groups of imprinted sheets; counter controlled imprinting transfer means operable when the last sheet of a set is not to have a label applied thereto for effecting an automatic transfer of the imprinting function from an imprinting impression member to an idle impression member immediately upon the imprinting of the last sheet of said group; and second control means for correlating the functioning of the labelling means with the functioning of the imprinting mechanism to effect the transfer of the imprinting function when the last sheet of a set is to have a label applied thereto.

5. A machine for imprinting previously printed sheets and preparing them for distribution, comprising: an imprinting mechanism having a plurality of impression members which are provided with different, removable imprinting means, one of said members performing an imprinting function at any given time while others are idle so that said members may function alternatively to continuously imprint seriatim previously printed sheets delivered to the imprinting mechanism in a stream to provide successive predetermined groups of said sheets with different imprints; labelling means for applying labels seriatim to imprinted sheets delivered from the imprinting mechanism to provide label sets which are correlated with said groups; imprinting transfer means for effecting an automatic transfer of the imprinting function from an imprinting impression member to an idle impression member when the last imprinted sheet of a predetermined group has been imprinted; control means responsive to information associated with the labels for correlating the functioning of the labelling means with the functioning of the imprinting transfer means; sheet sensing means for sensing the absence of a sheet in the stream; and means operatively associated with the sensing means and the transfer means to suspend operation of the transfer means until the number of sheets imprinted corresponds exactly with the number of labels to be applied.

6. A machine for imprinting previously printed sheets and preparing them for distribution comprising: sheet conveyor means having an infeed end and an outfeed end, and having a predetermined number of sheet spaces therebetween; an imprinting mechanism having a plurality of impression members which are provided with different, removable imprinting means, one of said members at any given time performing an imprinting function at a first sheet space while the others are idle so that said members may function alternatively to continuously imprint previously printed sheets seriatim to provide successive predetermined groups of sheets with different imprints; labelling means for applying labels seriatim to the imprinted sheets in sets which are correlated with the aforesaid groups of sheets, said labelling means including a labelling member which applies a label to a sheet in a second sheet space which is a predetermined number of spaces from said first sheet space; and control means arranged to correlate the functioning of the labelling means with the functioning of the imprinting mechanism by automatically transferring the imprinting function from an imprinting impression member to an idle impression member when the last sheet to be included in a given label set is at said first sheet space.

7. A machine for imprinting previously printed sheets with quick drying ink and preparing them for distribution, comprising sheet conveyor means having an infeed end and an outfeed end, said conveyor means being adapted to carry sheets seriatim in precisely spaced relationship; an imprinting mechanism having an impression member adjacent a first part of said conveyor means to imprint, seriatim, sheets on said conveyor means; a labelling mechanism having a labelling member adjacent a second part of said conveyor means to apply labels seriatim to imprinted sheets on said conveyor means; means for disabling said imprinting mechanism for an indeterminate time at the will of an attendant; sheet reject mechanism having selectively operable sheet deflecting means between the imprinting mechanism and the labelling mechanism to deflect sheets from said conveyor means and bypass the labelling mechanism; and reject control means responsive to operation of said disabling means for a longer time than is required for the ink to dry on an impression member, to actuate said deflecting means and deflect any sheet which was improperly imprinted because of the operation of said disabling means.

8. A machine for imprinting previously printed sheets with quick drying ink and preparing them for distribution, comprising sheet conveyor means having an infeed end and an outfeed end, said conveyor means being adapted to carry sheets seriatim in precisely spaced relationship; an imprinting mechanism having an impression member adjacent a first part of said conveyor means to imprint, seriatim, sheets on said conveyor means, said mechanism being arranged to ink properly said member no later than a predeterminel number of imprinting cycles after the mechanism commences imprinting operation; a labelling mechanism having a labelling member adjacent a second part of said conveyor means to apply labels seriatim to imprinted sheets on said conveyor means; means for disabling said imprinted mechanism for an indeterminate time at the will of an attendant; sheet reject mechanism having selectively operable sheet deflecting means between the imprinting mechanism and the labelling mechanism to deflect sheets from said conveyor means and bypass the labelling mechanism; and reject control means responsive to operation of said disabling means for a longer time than is required for the ink to dry on an impression member, to actuate said deflecting means and deflect a predetermined number of sheets at least one of which was improperly imprinted because of the operation of said disabling means.

9. A machine for imprinting previously printed sheets with quick drying ink and preparing them for distribution, comprising sheet conveyor means having an infeed end and an outfeed end, said conveyor means being adapted to carry sheets seriatim in precisely spaced relationship; an imprinting mechanism having an impression member adjacent a first part of said conveyor means to imprint, seriatim, sheets on said conveyor means, said mechanism being arranged to ink properly said member no later than a predetermined number of imprinting cycles after the mechanism commences imprinting operation; counter means adjacent the first part of said conveyor to indicate the number of sheets carried to the imprinting mechanism; a labelling mechanism having a labelling member adjacent a second part of said conveyor means to apply labels seriatim to imprinted sheets on said conveyor means; means for disabling said imprinted mechanism for an indeterminate time at the will of an attendant; sheet reject mechanism having selectively operable sheet deflecting means between the imprinting mechanism and the labelling mechanism to deflect sheets from said conveyor means and bypass the labelling mechanism; and reject control means responsive to operation of said disabling means for a longer time than is required for the ink to dry on an impression member, to actuate said deflecting means and deflect a predetermined number of sheets at least one of which was improperly imprinted because of the operation of said disabling means, said reject control means controlling said counter means to correct the indication thereof for the number of improperly imprinted sheets.

10. A machine for imprinting previously printed sheets with quick drying ink and preparing them for distribution, comprising sheet conveyor means having an infeed end and an outfeed end, said conveyor means being adapted to carry sheets seriatim in precisely spaced relationship; an imprinting mechanism having a plurality of sequentially operative impression members each member having a different imprint means, said mechanism being adjacent a first part of said conveyor means and arranged to imprint, seriatim, sheets on said conveyor means for providing successive predetermined groups of sheets with different imprints; means for effecting an automatic transfer from one impression member to another impression member when the last sheet of a predetermined group has been imprinted; a labelling mechanism having a labelling member adjacent a second part of said conveyor means to apply labels seriatim to imprinted sheets on said conveyor means; means for disabling said imprinted mechanism for an indeterminate time at the will of an attendant; sheet reject mechanism having selectively operable sheet deflecting means between the imprinting mechanism and the labelling mechanism to deflect sheets from said conveyor means and bypass the labelling mechanism; reject control means responsive to operation of said disabling means for a longer time than is required for the ink to dry on an impression member, to actuate said deflecting means and deflect any sheet which was improperly imprinted because of the operation of said disabling means, and means for precluding actuation of said deflecting means when said impression members are being transferred.

11. A machine for imprinting previously printed sheets and preparing them for distribution, comprising: means for imprinting previously printed sheets seriatim; means for applying labels to the imprinted sheets in predetermined sets, and counter means associated with said label applying means for denoting a count of the sheets delivered therefrom, said count commencing with the first sheet of each of said sets.

12. A machine for imprinting previously printed sheets and preparing them for distribution, comprising: alternatively operative means for imprinting previously printed sheets seriatim to provide successive predetermined groups of sheets with different imprints; means for applying labels to the imprinted sheets in predetermined sets correlating with the aforesaid groups of sheets; and means associated with each of said means for denoting a count of the sheets delivered from the label applying means, said count commencing with the first sheet of each of said sets.

13. A machine for imprinting previously printed sheets and preparing them for distribution, comprising: alternatively operative means for imprinting previously printed sheets seriatim to provide successive predetermined groups of sheets with different imprints; means for applying labels to the imprinted sheets in predetermined sets correlating with the aforesaid groups of sheets; means associated with the imprinting means for indicating the last sheet of each group of sheets having different imprints; and means associated with each of said means for denoting a count of the sheets by segregating the sheets into blocks containing a predetermined number of sheets and indicating the last sheet in each block, said count commencing with the first sheet of each of said sets.

14. The machine of claim 13 which includes means for disabling the count denoting means when the last sheet of a block of sheets coincides with the last sheet of an imprint group.

15. A machine for imprinting previously printed sheets and preparing them for distribution, comprising: alternatively operative means for imprinting previously printed sheets seriatim to provide successive predetermined groups of sheets with different imprints; means for applying labels to the imprinted sheet in predetermined sets correlating with the aforesaid groups of sheets, the label applying means being arranged to be inoperative when desired to permit delivery therefrom of imprinted, unlabeled sheets; and control means associated with each of said means for causing automatically the label applying means to operate when the first sheet of an imprint group of sheets is delivered to the label applying means.

16. A machine for imprinting previously printed sheets and preparing them for distribution, comprising; alternatively operative means for imprinting previously printed sheets seriatim to provide successive predetermined groups of sheets with different imprints; means for applying labels to the imprinted sheets in predetermined sets correlating with the aforesaid groups of sheets, the label applying means being arranged to be inoperative when desired to permit delivery from the machine of imprinted, unlabeled sheets; control means associated with each of said means for automatically causing the label applying means to operate when the first sheet of an imprint group of sheets is delivered to the label applying means; and means for selectively disabling said control means.

17. The machine of claim 16 in which the last named means comprises a manually operable pushbutton electrically associated with said control means.

18. A machine for imprinting previously printed sheets and preparing them for distribution, comprising: alternatively operative means for imprinting previously printed sheets seriatim to provide successive predetermined groups of sheets with different imprints; means for applying labels to the imprinted sheets in predetermined sets correlating with the aforesaid groups of sheets, the label applying means being arranged to be inoperative when desired to permit delivery from the machine of imprinted, unlabeled sheets; control means associated with the labels for automatically maintaining operation of the label applying means when the last label is applied to a set of labelled sheets, provided the next set is to be labelled.

19. The machine of claim 18 in which the last label to be applied to a set of labelled sheets includes signal means, and the control means includes means for sensing said signal means.

20. A machine for imprinting previously printed sheets and preparing them for distribution, comprising: alternatively operative means for imprinting previously printed sheets seriatim to provide successive predetermined groups of sheets with different imprints; means for applying labels to the imprinted sheets in predetermined sets correlating with the aforesaid groups of sheets, the label applying means being arranged to be inoperative when desired to permit delivery from the machine of imprinted, unlabelled sheets; control means associated with the labels for automatically terminating operation of the label applying means when the last label is applied to a set of labelled sheets, provided the next set is to be unlabelled.

21. The machine of claim 20 in which the last label to be applied to a set of labelled sheets includes signal means, and the control means includes means for sensing said signal means.

22. In a label applying mechanism: a backing roller; means for pulsatingly moving a continuous strip of labels into surface contact with said backing roller; a shaft parallel to the backing roller; a knife fixed on said shaft with a cutting edge in parallel, spaced relationship to the axis of the shaft to move through a path which bears on the backing roller at one point; and drive means for rotating the shaft pulsatingly in coordination with the strip movement, said drive means being arranged to provide a knife edge speed which is coordinated with the speed of the strip at said point, with a rate of acceleration and deceleration different from the rate of acceleration and deceleration of said strip.

23. A machine for imprinting previously printed sheets and preparing them for distribution, comprising; imprinting mechanism having a plurality of imprinting members sequentially operative to imprint seriatim, sheets in predetermined groups; labelling mechanism for applying as desired labels seriatim to said sheets; first control means for actuating the imprinting mechanism to transfer the imprinting function from one imprint member to a different one; second control means for effecting operating changes in the labelling mechanism; means for conditioning the first and second control means for correlative functioning; and means providing a suitable signal to the conditioning means to effect an operational change in the labelling mechanism selectively in conjunction with, or independently of a transfer of the imprinting members.

24. The machine of claim 23 in which the signal means includes means responsive to the number of sheets imprinted by an imprint member, and means associated with the labels initiating a desired operation of the labelling mechanism immediately after and in timed relationship with a transfer of the imprint members.

25. The machine of claim 23 in which the signal means includes suitable indicia associated with the labels for preparing the conditioning means alternatively to effect a transfer of the imprint members while maintaining the operational status of the labelling mechanism, or to effect a transfer of the imprint members and effect concurrently a change in the operational status of the labelling mechanism, or to permit continued imprinting by one imprint member and effect a change in the operational status of the labelling mechanism.

26. The machine of claim 25 in which the indicia comprises at least one signal mark carried directly by a label.

27. A machine for imprinting previously imprinted sheets and preparing them for distribution, comprising: means for imprinting previously printed sheets seriatim in predetermined groups; means for applying labels to the imprinted sheets in predetermined sets correlated with the predetermined groups; means for delivering the sheets in a stream from the label applying means; and means for indicating the groups and sets comprising means for displacing the last sheet of each set and group relative to the stream.

References Cited in the file of this patent

UNITED STATES PATENTS

| | | |
|---|---|---|
| 1,534,464 | Renz | Apr. 21, 1925 |
| 1,557,944 | Reisbach | Oct. 20, 1925 |
| 1,961,724 | Zenke | June 5, 1934 |